United States Patent [19]

Teder

[11] Patent Number: 5,568,027
[45] Date of Patent: Oct. 22, 1996

[54] SMOOTH RAIN-RESPONSIVE WIPER CONTROL

[75] Inventor: Rein S. Teder, Bloomington, Minn.

[73] Assignee: Libbey-Owens-Ford Co., Toledo, Ohio

[21] Appl. No.: 444,904

[22] Filed: May 19, 1995

[51] Int. Cl.$^6$ .................................................. H02H 07/08
[52] U.S. Cl. ..................... 318/483; 318/283; 318/643; 318/444; 318/DIG. 2
[58] Field of Search ................................. 318/483, 444, 318/DIG. 2, 643, 280, 281, 283, 285, 286, 443; 15/250.13; 73/861.41; 160/11

[56] References Cited

U.S. PATENT DOCUMENTS

| | | |
|---|---|---|
| 4,355,271 | 10/1982 | Noack . |
| 4,542,325 | 9/1985 | Kobayashi et al. . |
| 4,620,141 | 10/1986 | McCumber et al. . |
| 4,942,349 | 7/1990 | Millerd et al. ......................... 318/483 |
| 5,059,877 | 10/1991 | Teder . |
| 5,216,341 | 6/1993 | Nomura et al. ..................... 318/DIG. 2 |
| 5,239,244 | 8/1993 | Teder . |
| 5,252,898 | 10/1993 | Nolting et al. . |
| 5,453,670 | 9/1995 | Schafer ................................ 318/444 |

FOREIGN PATENT DOCUMENTS 4018903  10/1992  Germany .

Primary Examiner—John W. Cabeca
Attorney, Agent, or Firm—Haugen and Nikolai, P.A.

[57] ABSTRACT

Disclosed is an automatic windshield wiper control system which responds to sensed moisture in a manner which is responsive to changes in conditions, yet subjectively smooth. Moisture and noise sensitive signals from a sensor are digitized, and a functional block detects the reversals of the moisture sensing signal towards a quiescent level. These reversals are considered rain events and a method is disclosed for producing an ongoing measure of the frequency of these events. The resulting signal is representative of the flow rate of the raindrops impinging upon the moisture sensor. Another functional block with a logarithmic characteristic converts this quantity into an intensity value, in a manner which mimics human perception. A multiple time-constant averaging means maintains a value representative of the long-range prevailing conditions under which the device is operating. This long range average is combined with a medium range average to produce a rain-intensity signal which permits rapid but bounded response to sudden changes in conditions. A mode-determination block uses this signal to determine the appropriate wiper actuation rate. The disclosed control strategy features hysteresis, giving the system a propensity to continue operating in a given mode.

20 Claims, 22 Drawing Sheets

SMOOTHING ALGORITHM OVERVIEW

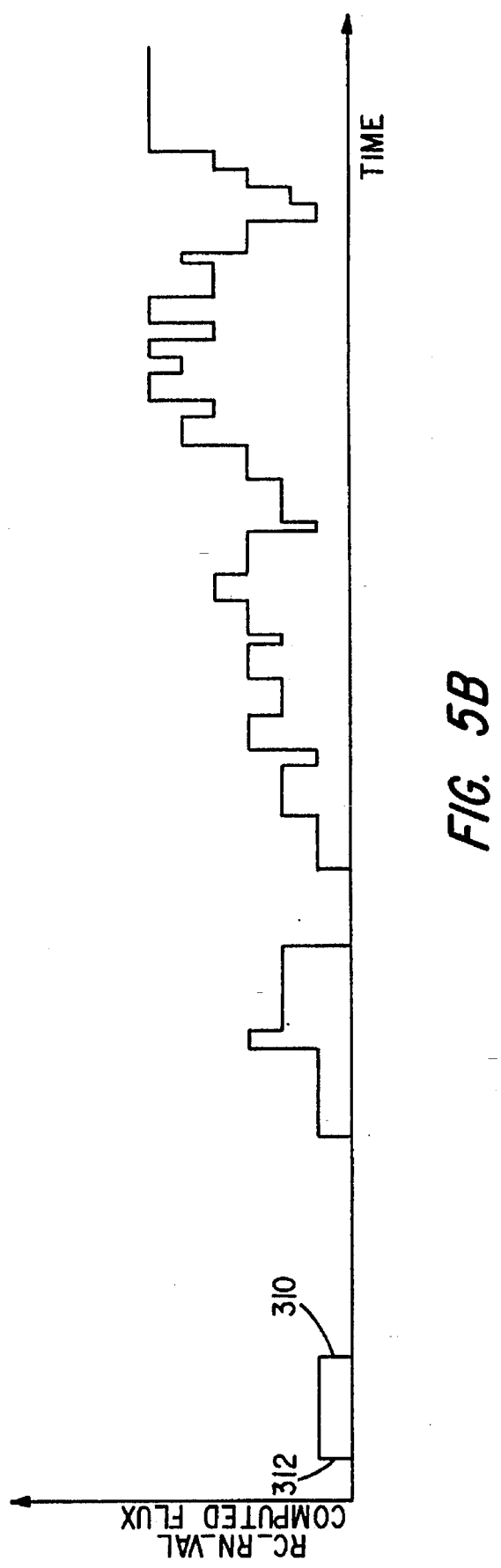

1

SMOOTH RAIN-RESPONSIVE WIPER CONTROL

BACKGROUND OF THE INVENTION

I. Field of the Invention

The present invention describes a rain-responsive wiper control system which responds rapidly to changes in moisture conditions, yet does not change modes of operation so frequently as to be subjectively erratic. As a result, the resulting system is simultaneously smooth and responsive—two characteristics not available in prior art wiper control systems.

I. Discussion of the Prior Art

A moisture sensing windshield wiper control system must necessarily employ some moisture sensing means. Referring to FIG. 1 of the drawings, this sensing means may, for purposes of illustration, be an optical sensor 1, such as is disclosed in the McCumber et al. U.S. Pat. No. 4,620,141 and the Teder U.S. Pat. No. 5,059,877 disposed on the inside surface of a windshield 2, within the path 3 swept by wiper blades 4. This moisture sensing means 1 may also be capable of sensing disturbances, such as shadows, as described in U.S. Pat. No. 5,059,877. For further purposes of illustration, the components of a moisture-sensitive wiper control system may be partitioned into the functional elements illustrated in FIG. 2. In FIG. 2, the output 10 of a rain sensing means 1 is coupled to the input of an analog-to-digital converter 11. A smoothing algorithm 12, implemented either in hardware or software, then actuates the wipers 4 in what it determines to be an optimum manner, by applying appropriate signals to a wiper motor 13, by way of a vehicle interface 14. Input from the driver concerning operating mode and desired system sensitivity is imparted to the vehicle interface 14 by means of a driver accessible switch 15, conventionally mounted on the steering column. A suitable vehicle interface has been disclosed in U.S. Pat. No. 5,239,244, which is also assigned to applicant's assignee.

In its most primitive form, the smoothing algorithm 12 may simply run the wiper motor 13 when the presence of moisture is detected, and many prior art rain-responsive wiper control systems posit this as a means of control (e.g. Noack, U.S. Pat. No. 4,355,271). This simple method suffers at least two drawbacks: 1) The area of the windshield sampled by the sensor is small compared to the windshield as a whole, thus tending toward erratic behavior arising from the random nature of the signal; and, 2) Even were the sample area of the windshield large enough, it is subjectively annoying to the driver of the vehicle for the wiper to actuate in an erratic manner, even if the rainfall itself is fluctuating in an erratic manner.

Thus some degree of moisture-sensor response smoothing is desirable. One method, realized with analog electronic components, is disclosed in the above-referenced U.S. Pat. No. 4,620,141. In U.S. Pat. No. 5,059,877, the smoothing function is refined and implemented in the software of a microcontroller. Acceptable system behavior is obtained from this method, but the resulting performance constitutes a tradeoff between smoothness and responsiveness.

FIG. 3 diagrammatically illustrates the prior smoothing method embodied in the '877 patent. Sensing means 1 produces a signal on line 10. It is coupled to a block 21 which takes the absolute value of the deviation of the signal 20 from its quiescent level. The resulting rain deviation signal 22 is coupled to a curve shaping means 23 which produces pulses 24 which are proportional to the degree to which the deviation signal 22 exceeds a threshold. This essentially amplitude-dependent pulse-signal on line 25 is coupled to an averaging means 26. The averaging means 26 produces an ongoing estimate 27 of moisture flow or flux. The circuit components 28-31 comprising the averaging means 26 respond to increases in signal amplitude more rapidly than to decreases. That is, the means 26 features asymmetric attack and decay rates. This and other prior methods of smoothing the response of the rain sensor have fallen short of optimum because of underlying principles which will be identified and discussed as the present invention is described.

A first limitation of prior art rain responsive systems is that methods used to determine the flow-rate (flux) of the rainfall are inadequate. The prior art approaches typically center around the duration or amplitude of signal excursions of the moisture-sensitive signal. The resulting signal is only loosely correlated to the actual flow rate of the rainfall. Koybayahi teaches (U.S. Pat. No. 4,542,325) that sensor amplitude may be integrated before comparison to a threshold, but this does not circumvent the effects of small sample size. Mangler teaches (German Patent DE 40 18 903 C 2) that the intensity may be derived from the period between successive detections of the sensing means, but this too may be expected to vary wildly. The underlying difficulty is that, while they are simple to implement, the primarily amplitude-dependent or period-dependent sensing methods of prior art automatic rain responsive wiper control systems do not estimate rain flow-rate (flux) as accurately as does a frequency-oriented method which, as will be described, is implemented in the preferred embodiment of the present invention.

Another recognized limitation of prior art rain responsive wiper systems is that, in general, quantities related to the rain flow rate are linear in nature, while most aspects of human perception tend to be logarithmic in nature. That is, amplitude excursions, estimated rate of rainfall, and time-based measurements are all linear quantities. While these linear representations are simple to implement in an electronic system, they are at odds with the nature of most aspects of human perception. For example, sound intensity and frequency are both perceived logarithmically by humans, as is light intensity. Human perception of time may also be considered to be logarithmic in nature. For example, the difference between wipe rates of one per second and two per second is considerable, while the difference between ten per second and eleven per second is not readily perceptible. In failing to address the nature of human perception, prior art rain responsive wiper systems inherently represent large changes in the perceived wipe period with merely small numerical changes in the contents of an internal register within its microcontroller potentially leading to resolution difficulties. It is reasonable to suppose that a microprocessor based system with a word size of, say, 8 bits is capable of providing a resolution more in line with human perception and, hence, can be made to behave in a manner more subjectively pleasing to humans.

A further limitation of known prior art systems is that they operatively contain a single time constant based on prior history of rain accumulation. The rate of wiper actuations should most properly be based upon the prevailing, long term (on the order of tens of seconds) conditions in which the vehicle is operating, as well as the shorter (on the order of seconds) term fluctuations of the sensed rain signal.

The system described in the Koybayahi patent effectively implements a short time constant, the effects of which are "forgotten" by the system after each wipe period. The aforereferenced U.S. Pat. No. 4,620,141 teaches that a time constant may be applied to the sensor output, and this will inherently permit the period of prior wipe accumulation history to be considered in determining an appropriate wipe rate. Similarly, Mangler teaches (German Patent DE 40 18 903 C 2) that the consideration of prior history can be a function of prior wipe-periods. This also has the effect of implementing a single time-constant response. None of the prior art systems maintains a separate signal or register value which corresponds to the prevailing long-term conditions experienced by the vehicle equipped with a rain sensor.

OBJECTS

It is an object of the present invention to overcome the aforementioned limitations of prior art, and thus provide a more subjectively pleasing control of the windshield wiper system.

Another object is to provide a means for determining rain flow rate based on the output of the moisture sensitive signal, in a manner which more accurately corresponds to actual flow rate.

Still another object of the invention is to maintain an internal representation of rain intensity which more closely corresponds to human perception.

Yet another object is to provide an automatic rain-responsive wiper control system that maintains a long-term average of prevailing conditions, and adjusts the final determination of wiper actuation rate accordingly.

A further object is to provide a means for rapid response to changes in driver-requested sensitivity. This provision is especially helpful because of the long time constants required to sense prevailing conditions.

A still further object is to provide a control strategy for a rain responsive wiper system which features a propensity for continued operation of the wipers in a given mode.

SUMMARY OF THE INVENTION

In accordance with the present invention, there is provided a rain responsive windshield wiper control system for controlling the operation of a windshield wiper motor as a function of the intensity of the moisture striking the windshield. A sensor is disposed at a predetermined location on the vehicle's windshield so that it is traversed by the wiper. The sensor generates an output indicative of the moisture impinging on the windshield at the location which it occupies. Either analog circuitry or a programmed microcontroller is responsive to the rain event signals from the sensor and repeatedly determines the frequency of occurrence of the rain event signals within a predetermined time interval to thereby yield a recent rain flux value. A unique smoothing algorithm is embodied in the system for effectively eliminating momentary variations in the recent rain flux value. The system also includes a wiper mode control means that is operatively coupled to the smoothing means for establishing a sweep speed for the windshield wiper and it is the output of the wiper mode control means that causes the wiper motor to operate at a sweep speed established by the wiper mode control means.

The smoothing algorithm preferably includes a logarithmic conversion feature for converting a recent rain flux value to a recent rain intensity value, it being recognized that human perception in many instances tends to be logarithmic in nature. The smoothing algorithm also includes a means for forming a weighted average of medium term rain intensity and long term rain intensity using a multiple time constant averaging approach, the result being that excessively rapid responses of the wiper actuations to changing conditions is minimized.

DESCRIPTION OF THE DRAWINGS

The foregoing features and objects of the invention will become apparent to those skilled in the art from the following detailed description of a preferred embodiment of the invention, especially when considered in conjunction with the accompanying drawings in which like numerals in the several views refer to corresponding parts.

FIGS. 5A through 5E comprise waveforms all drawn to the same time scale and helpful in understanding the operation of the system of the present invention;

DESCRIPTION OF THE PREFERRED EMBODIMENT

Figure 2:
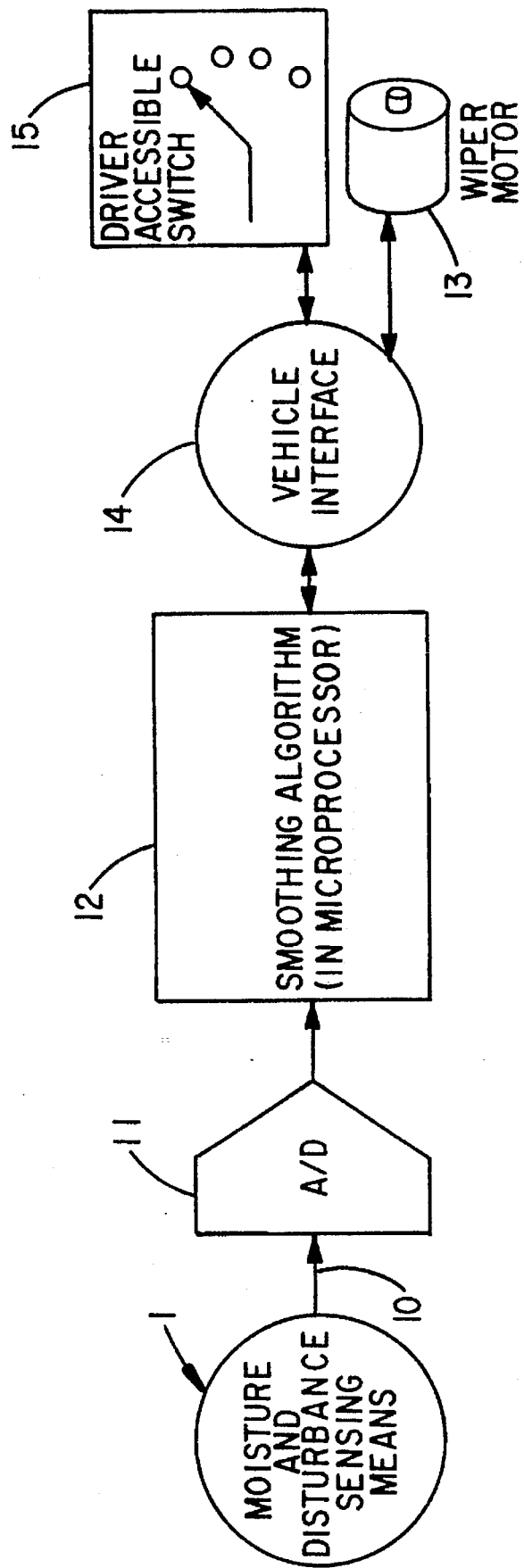
FIG. 2 is a block diagram illustration of a typical prior art rain responsive windshield wiper control system.
Figure 3:
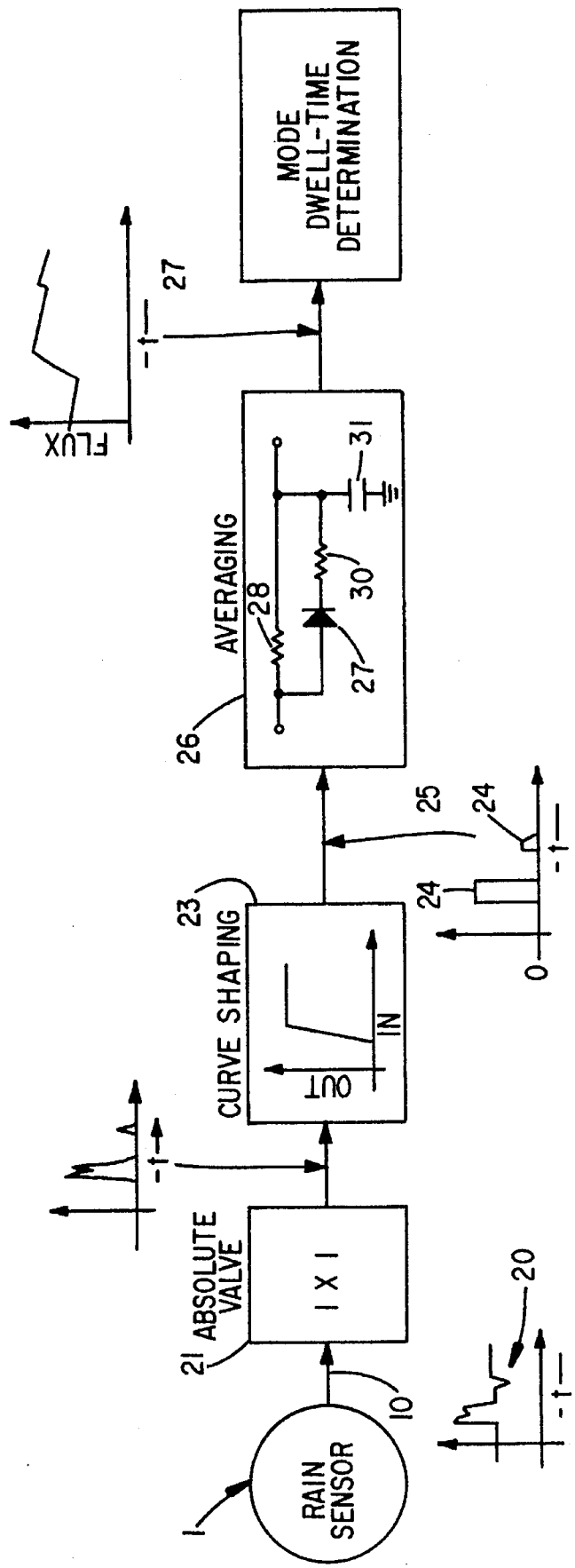
FIG. 3 is an illustration of a prior art smoothing algorithm used in implementing the system shown in FIG. 2.
Figure 4:
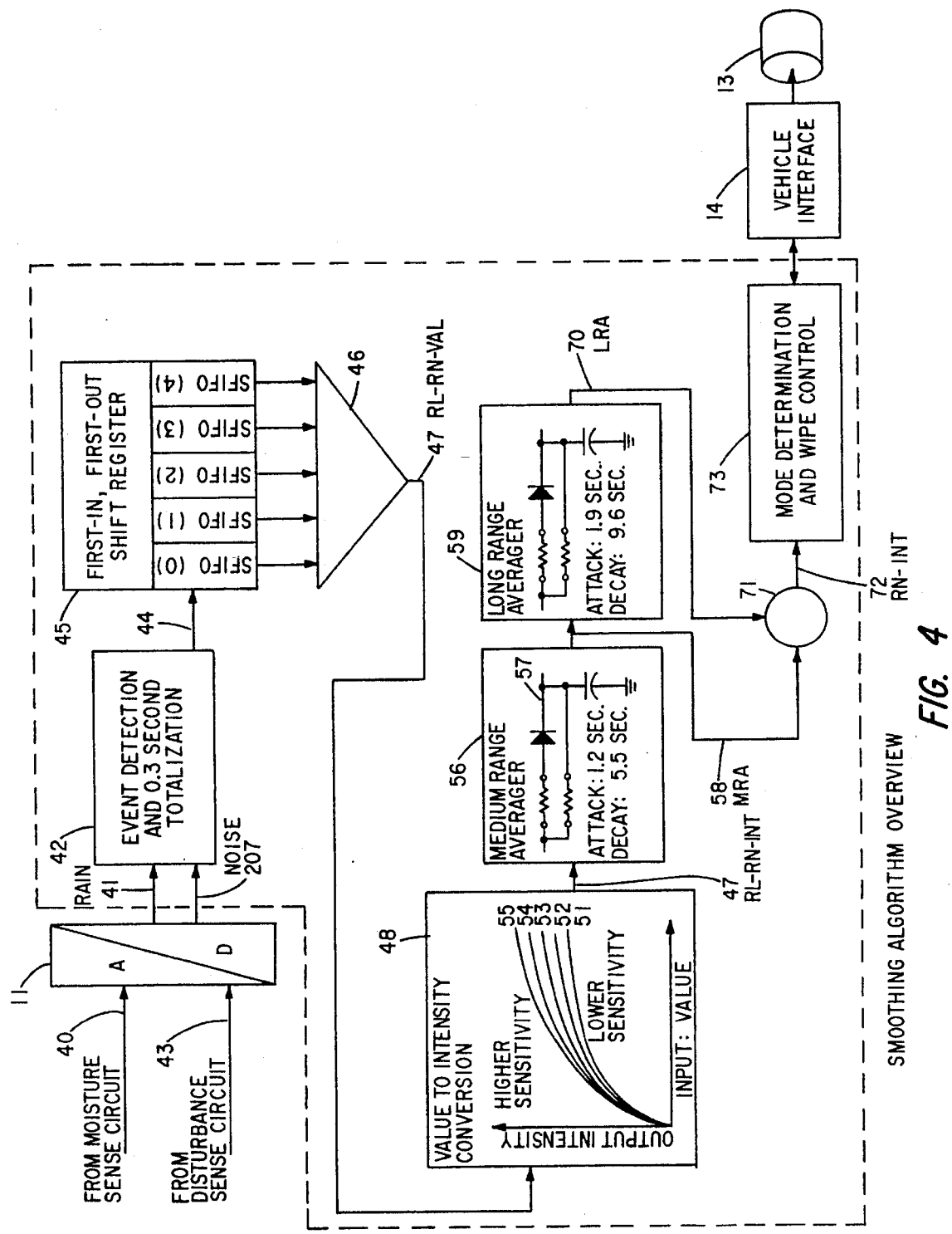
FIG. 4 is a block diagram representation of the system of the present invention showing the improved smoothing algorithm of the present invention enclosed in a dashed line box.

The rain responsive wiper control system of the present invention is shown schematically in block diagram form in FIG. 4. This block diagram is intended to replace the blocks A/D 11, smoothing method algorithm 12, and vehicle interface 14 in the system diagram of FIG. 2. The following text will describe the nature of each of the functional blocks. Detailed flow charts, which one skilled in the art of computer programming could utilize to write code for implementing the invention, follow after the general descriptions.

Typical Rain Events and Their Detection

In the present invention, the output from the moisture sensing circuit 1 comprises signal on line 40 which is coupled to an Analog-to-Digital converter 11. The digital output on line 41 from the A/D converter 11 is coupled to an event detection block 42. This block 42 also accepts a digital disturbance sensing signal on line 207, which is proportional to a sensed disturbance signal from sensor 1 applied to line 43, and is converted by the A/D converter 11 to a digital quantity. Subsequent processing of the signals on lines 41, 207 are preferably performed by a programmed microprocessor, but may also be implemented in either analog or digital discrete logic circuitry or a combination of the two.

Figure 5A:
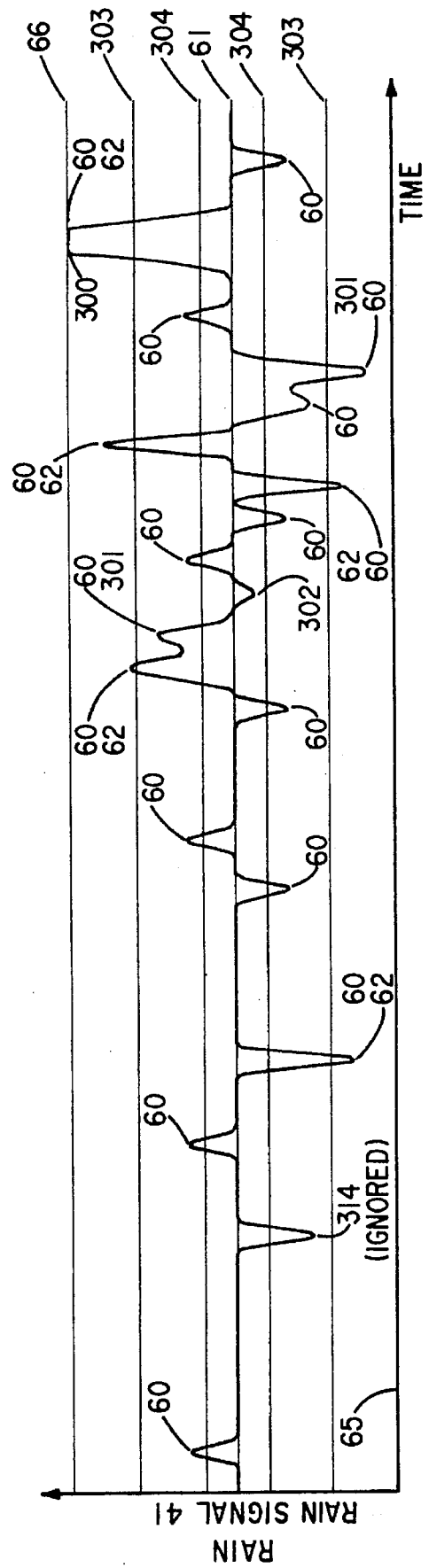

FIG. 5A shows typical signals generated by moisture sensing means 1 (after conversion to digital values). The illustration is representative of the sort of signals that might be generated at the onset of a rainstorm, as the rate of rainfall impinging upon the sensor 1 increases from zero to some value over the course of the graph. It should be noted that the preferred sensing device employed may produce either positive or negative signal excursions as the result of an impinging raindrop. FIG. 5A also shows that the sensed moisture signal becomes progressively more active over a span of, say twenty seconds. The time scale depicted in this plot may typically be approximately twenty seconds.

The event detection block 42 (FIG. 4), described in detail later in the flow charts of FIGS. 9 and 10, essentially counts the reversals of the rain event pulses 60 (FIG. 5A) towards a quiescent value 61 of the digitized rain signal developed on line 41 in FIG. 4. Each such reversal 60 is considered to be a "rain event." Signals in the presence of noise, as at 314, as well as small perturbations, as at 302, are not considered "rain events". A central feature of smoothing algorithm of the present invention is that rainfall flow-rate measurement are taken to be primarily a "number of events per unit time," i.e., a frequency phenomena. The driver of the vehicle perceives the flow rate on the windshield primarily as a frequency of impinging raindrops. Thus, the smoothing algorithm in accordance with the present invention is intended to mimic human perception.

It has been observed from experimental data that a consistent flow-rate of rainfall will tend to yield a reasonably consistent frequency of rain events detected by the sensor. In contrast, the amplitude of successive events varies considerably, and the period between events varies wildly. Thus the primarily amplitude and period oriented schemes of the prior art do not measure the flow rate as accurately as does the frequency-oriented approach used in the algorithm of this invention.

While the smoothing algorithm discussed herein is primarily concerned with the frequency of the rain events, as depicted by the pulses 60 in FIG. 5A, it is recognized that the driver of the vehicle will, in some measure, consider the size of the raindrops as well. Further, there is some weak correspondence between size of the impinging raindrop and size of the excursion of the digitized sensed rain signal developed on line 41. Thus, each signal excursion 62 in excess of some threshold 303 (shown both positive and negative with respect to quiescent level 61) is counted by the detection block 42 as two events. Similarly, excursions smaller than some threshold 304, as at 302, are not counted as rain events. Also, when the digitized rain signal on line 41 goes into saturation, i.e., the digitized rain signal is at a minimum level 65 or maximum level 66, the system counts an event for each unit of time (say, 0.3 seconds) during which the signal remains in saturation. As illustrated at the time identified by numeral 300, this is equivalent to assuming the occurrence of events when the digitized rain signal has become too large to discern such individual events. These amplitude-dependent features permit some consideration of drop size, while retaining a primarily frequency-oriented approach.

Note further from FIG. 5A that some rain events, like at 301, may occur before the sensed rain signal has returned to its quiescent level 61. These signals are also caused by impinging raindrops, and are thus counted as rain events. The method used by event-detection block 42 (FIG. 4) for extracting this information will be set forth hereinbelow when the flow charts of FIGS. 9 and 10 are described.

Conversion of Events to Event Frequency

The smoothing algorithm of the present invention determines the flow rate of the rainfall by counting the number of rain events in a given interval of time. To do this, the digital values on line 44, representing the number of events, are shifted into a First-In, First-Out (FIFO) Shift Register 45. This register is shifted regularly (say, every 0.3 seconds.), and events shifted out the highest order stage (SFIFO(4)) are forgotten. The total number of events counted within this shift register at any one time are added together by a summing means 46, and the result of this summation is an estimate of the rain flux value or recent rain value (RC_RN_VAL) appearing at the output 47 of the summer 46. A typical signal waveform 305 is illustrated for this flux value 47 in FIG. 5B.

It may be seen in FIG. 5B that the flux value signal RC_RN_VAL increments upon detection of each rain event. The signal later decrements at a fixed time (1.5 seconds) after the original event, as that event is shifted out of the shift register 45. For illustration, one such originating event signal 312 and decrement 310 is specifically illustrated. By way of this ongoing increment and decrement to the flux value signal at output 47, an ongoing determination of the number of events per-unit time is maintained. Experiments reveal that this event-frequency method of discerning flow-rate (flux) is considerably more accurate than the purely amplitude dependent schemes of the prior art. Additionally, the flux-sensing method inherently provides some smoothing of the digitized sensed-rain signal on line 41, as the number of events per unit time can neither increase to a large level nor decrease to zero instantaneously.

Figure 5C:
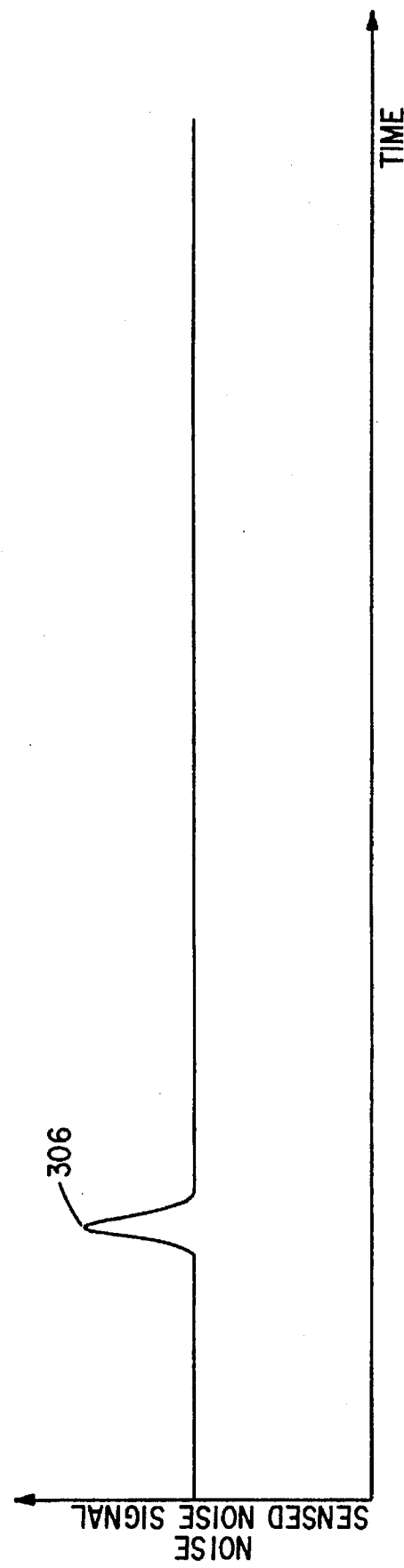
Figure 5D:
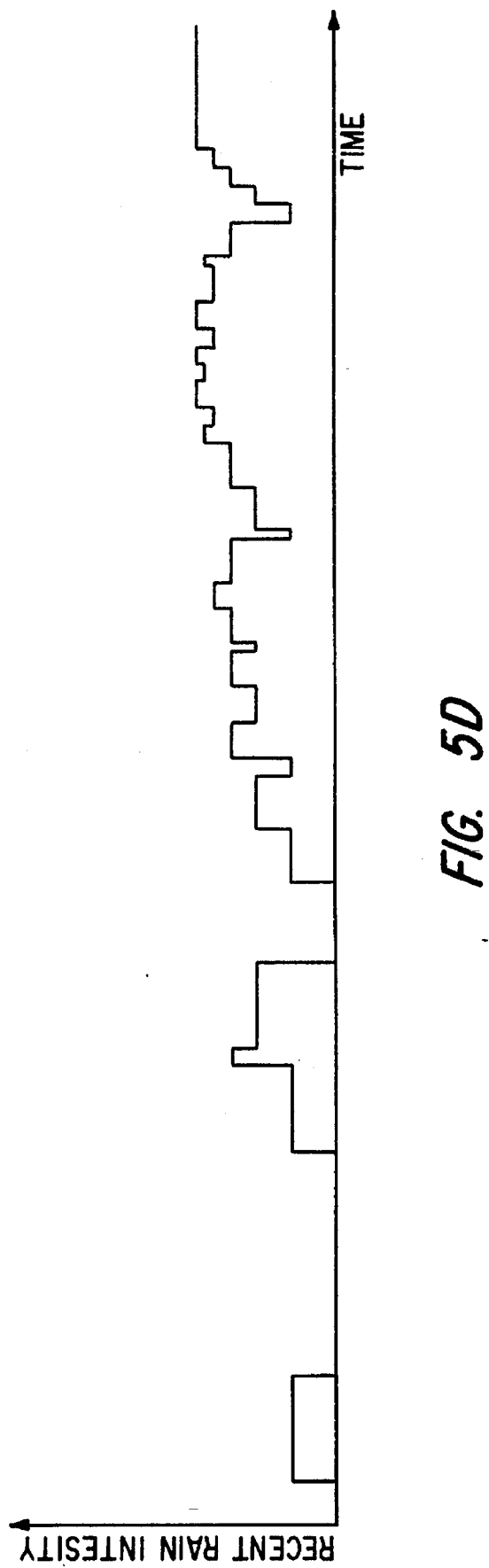

Referring again to FIG. 4, the event detection and totalizing means 42 has provision for ignoring events in the presence of severe disturbances. Such an event (e.g. event 314, FIG. 5A) is typically the result of a large ambient light disturbance represented by impulse 306 in the plot of FIG. 5C. Ambient light disturbances, such as might be cause by the shadows of telephone poles and other roadside obstructions, in some measure effect the sensed rain signal 41. It is desirable that these disturbances not be considered as "rain events", and a method for rejecting them is described in detail later with the aid of FIG. 10.

As previously noted, in the preferred embodiment of the moisture sensing device 1, the resulting sensed moisture signal is bipolar in nature. The technique of intensity measurement set forth in the invention is equally applicable to unipolar signals resulting from other rain sensing means, such as conductive, capacitive, or piezoelectric means, as set forth in prior art systems. For proper discrimination of rain events, it may be necessary to place a differentiating means before the event detection block 42 for use with certain of those sensors.

Representation and Intensity

The RC_RN_VAL output of the rain event detection means 42 and moving summation 46 on line 47 may be considered to be proportional to flux, but it does not yet take into account the effects of human perception. Thus, the algorithm of the present invention couples the ongoing rain flux estimate to a value to intensity conversion means 48 for converting this flux value to an intensity value, RC_RN_INT, at output 49. This conversion means features a logarithmic characteristic, as illustrated by curves 51–55 within the functional block 48. This conversion is described in greater detail by the flow chart of FIG. 11. The output at 49 of this functional block 48 may be considered as an estimate of short-term rain intensity. In this case, "intensity" implies that the representation is in keeping with human perception.

Continuing the example set forth in FIGS. 5A–5C, FIGS. 5D–5E illustrates typical behavior of the intensity conversion block 48. The input to the intensity conversion block 48 is the ongoing recent estimate of flux, RC_RN_VAL. The result of the conversion is illustrated in FIG. 5B and comprises signal at 49 in FIG. 4. The term, "recent rain intensity," (RC_RN_INT) implies that the signal has considered the effects of human perception, but has not yet had the benefits of the multiple time-constant averaging yet to be described.

As mentioned above, a logarithmic characteristic matches the nature of human perception. For example, consider the effect of raindrops falling at random locations across the entire windshield at a rate of one per second. This would be perceived by the driver to be a low flow rate, dictating a delay of several seconds between wiper actuations. Consider next that adding an additional raindrop each second to the rainfall would double the flow rate. This would be quite noticeable to the driver. The driver would desire a decrease in the delay between wiper actuations in order to maintain the same degree of visibility. In contrast, consider ten drops per second falling over the surface of the windshield. This flow rate would likely require that the wipers be actuated at the steady slow speed in order to maintain good visibility. Now, the addition of a single drop per second to this condition would be much less noticeable to the driver, were it perceptible at all. The value-to-intensity conversion block 48 functions to mimic this behavior. Note that for larger values of rain flux, the steps between intensity levels become closer together.

A further benefit of incorporating this intensity conversion function into the smoothing algorithm of the present invention is that it permits the resolution required of each of the variables to be evenly spaced. Say, for example, that an eight-bit variable were used to represent the short term rain intensity at 49. This variable could assume 256 possible levels. Now suppose a change in the flow rate upon the sensor causes a shift in level from, say, 5 to 10. A driver viewing the impinging raindrops might say that there was a small, but perceptible shift in the rain intensity. Now consider a shift of the same subjective intensity but starting at a higher level, say from 200 to 205. The driver would see this as about the same perceptibility of shift. This even distribution of resolution carries over into many of the other variables and constants which will be discussed, such as the long range average variable, LRA, at the output 70 of average 59. Because of this even distribution of resolution, 256 possible levels of rain intensity is more than adequate, and the system can be implemented using an inexpensive, eight-bit microprocessor.

In contrast, consider a smoothing method which lacked this intensity compensation. In such a case, a shift in a variable representing flow rate from 5 to 10 would be perceived by the driver to be quite dramatic; it is a doubling of flow rate. The possible levels of rain flow rate between these values would be too coarsely spaced for smooth operation of the system. On the other hand, a shift in linearly represented flow rate from 200 to 205 would be imperceptible. Thus the resolution permitted at high flow rates is excessive, and at low flow rates it is inadequate. The same reasoning extends to most other variables and constants in the system. The resulting system without intensity compensation would, therefore, suffer performance anomalies resulting from quantization. Alternatively, more bits of resolution could be used to implement the required variables and constants, but this would necessitate a more expensive microprocessor.

Figure 1:
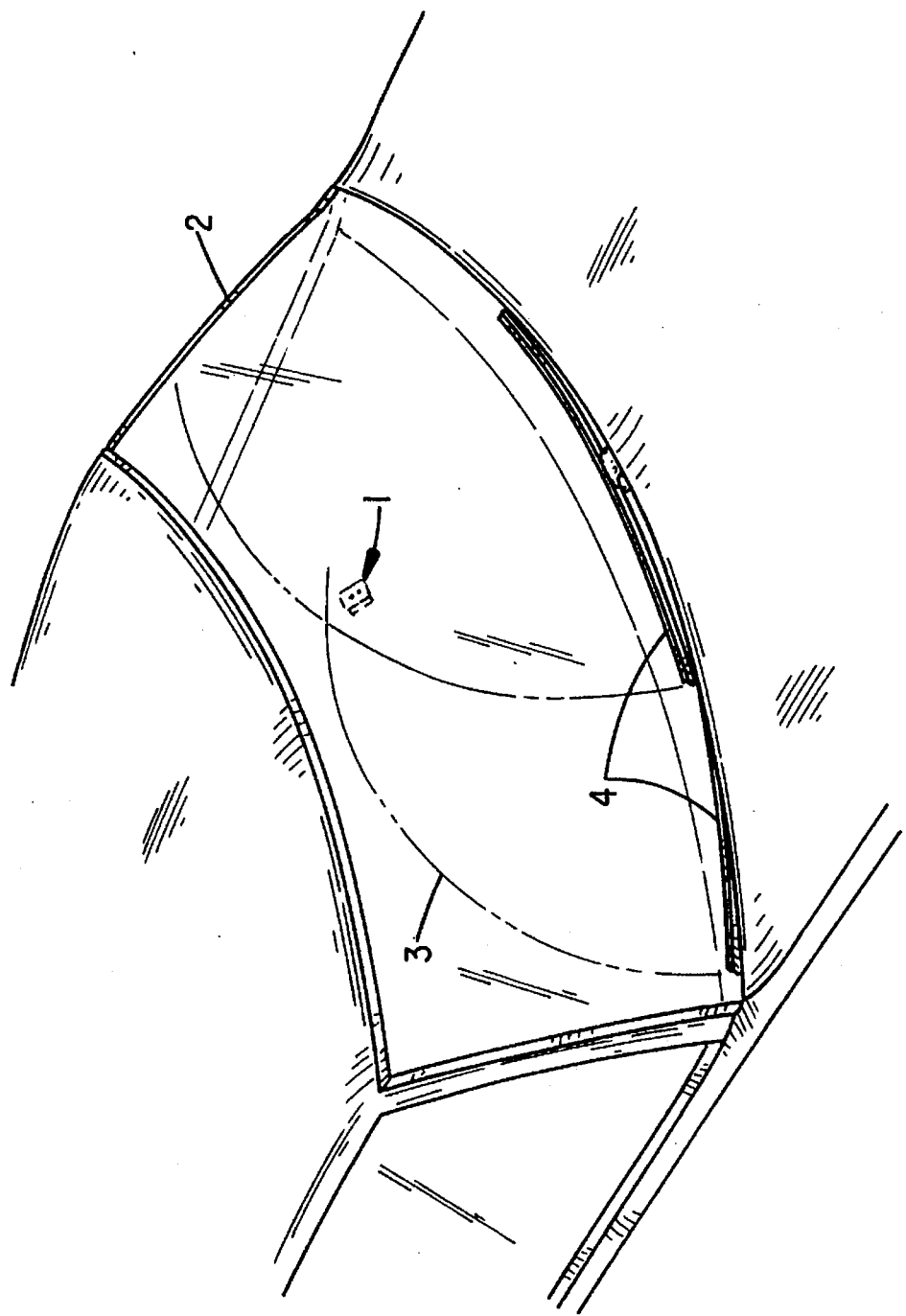
FIG. 1 is an illustration showing a rain sensor mounted on a windshield of a vehicle in accordance with the prior art.

It has been found that different drivers have widely divergent opinions about the desired wiper actuation rate for a given set of conditions. The relative response of the system to these conditions may be broadly referred to as the system's "sensitivity," and the driver preferences are communicated to the moisture-sensitive wiper control system by means of the sensitivity control located on driver accessible switch 15 (FIG. 1). The sensitivity setting is read into a register in the microcontroller by way of the vehicle interface 14. The sensitivity setting affects the flux-to-intensity conversion, resulting in a family of curves as at 51–55 in FIG. 48. Thus, a driver who perceives a given rainfall as being more substantial would set the sensitivity control to a higher level. This results in a higher internal representation of rain intensity.

Multiple Time-Constant Averaging

Figure 12:
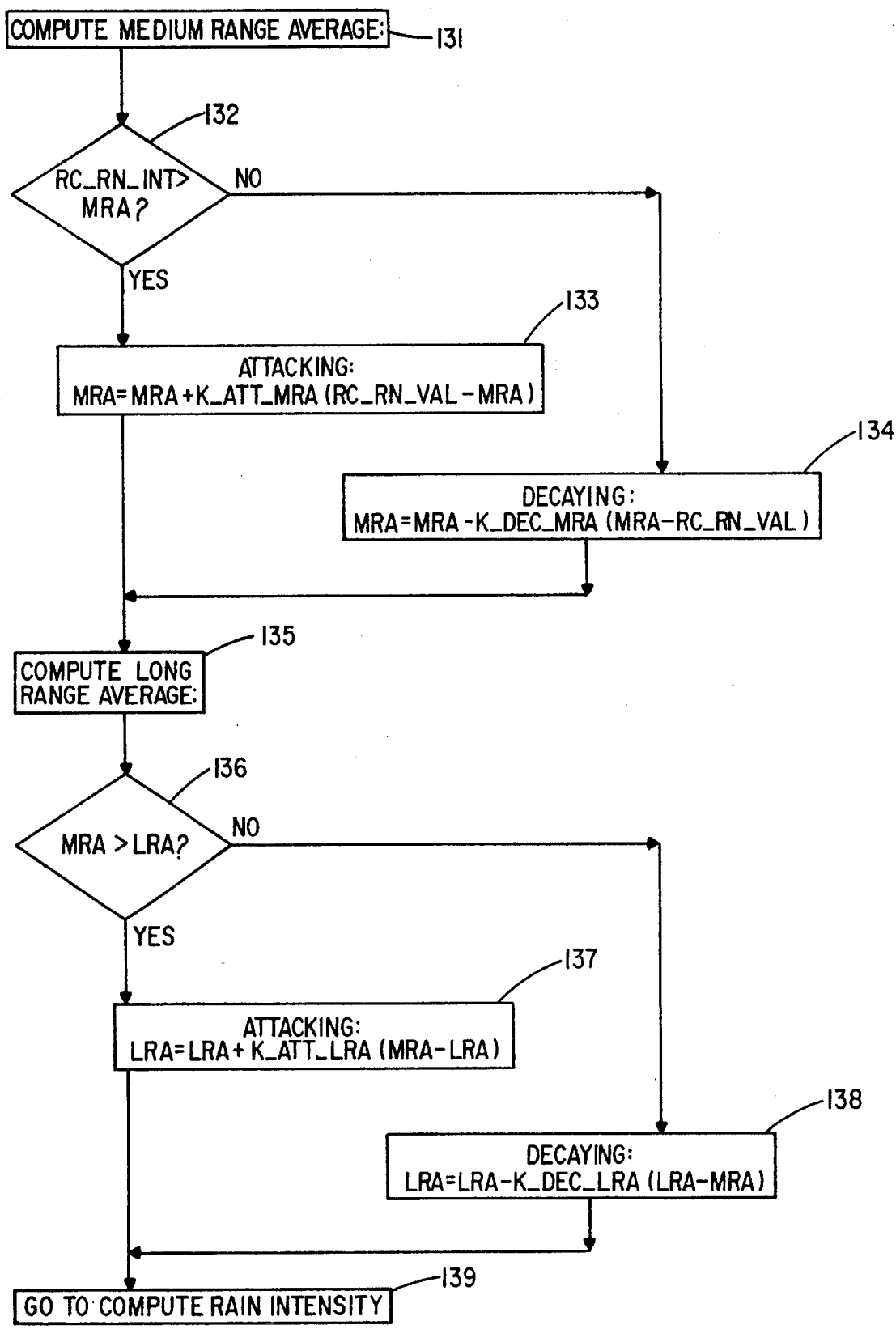
FIG. 12 is a software flow diagram of the steps for computing medium and long range averages.

As previously mentioned, excessively rapid response of the wiper actuations to changing conditions is subjectively undesirable. Thus, the output of the short-term rain intensity estimate at 49 is coupled to a medium range averager 56 for taking a medium range average of the signal. The medium range average is implemented with different time constants for attack and decay. For example, attack time may be 1.2 seconds and the decay time is 5.5 seconds. Such an averager can be constructed using a resistor/diode/capacitor network 57, as shown schematically in FIG. 4, or alternatively and preferably, this can be realized in software (FIG. 12).

Figure 5E:
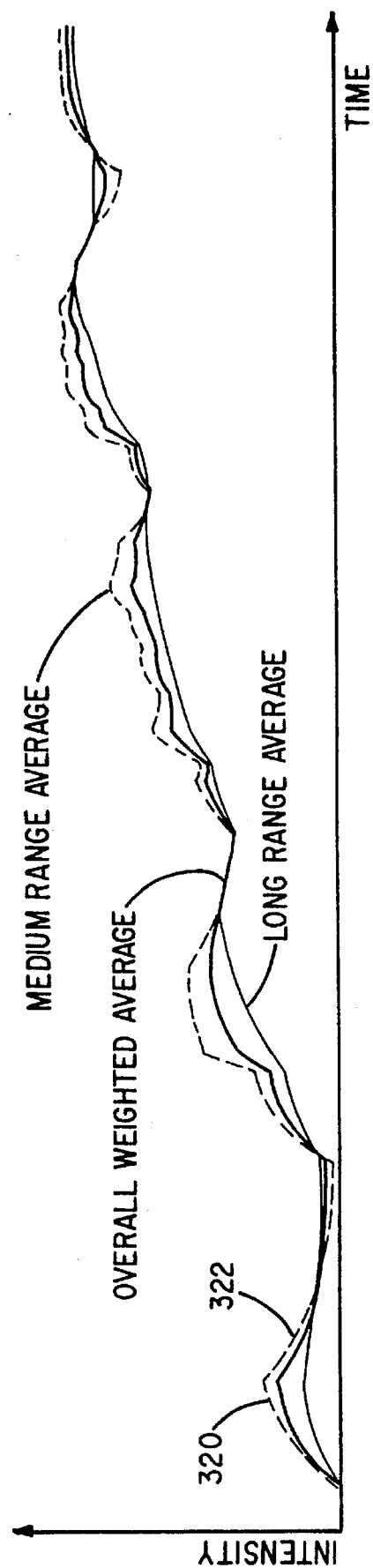

Referring to the plot of FIG. 5E, a typical response for the medium range average is labeled as such. It can be seen from this illustration that the medium range average signal at output 58 increases, or attacks, more rapidly than it decreases. See curve segments 320 and 322. The medium range offers only a modest amount of smoothing over the recent intensity signal, permitting reasonably rapid response.

In addition to maintaining a medium range average, the smoothing algorithm of the present invention proposes that the output 58 of the medium range averager be coupled to a long range averager 59. Thus, the already smoothed rain intensity signal is further smoothed over a longer period of time as determined by the long range averager. For example, the attack time constant for the lang range averager may be two seconds and the decay time constant ten seconds. The resulting signal at output 70 represents the long range prevailing conditions under which the vehicle is operating. This, again, is intended to mimic human perception. When the driver of a vehicle equipped with manually adjustable wipers sets the wiper speed, he or she will consider the prevailing operating conditions, as well as the current intensity of rainfall.

Also illustrated in FIG. 5E is a curve showing the typical result of this long range averaging by average means 59. As the signal at output 70 is intended to indicate the long-range prevailing conditions, it increases and decreases more slowly than does the medium range averager.

Overall Weighted Average

The outputs 58 and 70 from the medium range averager 56 and the long range averager 59 are applied to a summing means 71 which performs a weighted summation of the medium and long range average signals. The output 72 of this summation means 71 may be considered to be the overall rain intensity estimate. The system so described thus produces an estimate of the rain intensity which is proportional to the human-perceived rate of rainfall impinging upon the windshield. Because of the effects of the separately maintained long-range average, the resulting rain intensity estimate considers both the recent history of the rain sensing signal (at 58), as well as the prevailing long-term conditions under which the sensor is operating (at 70). A typical overall weighted average signal is so labeled in FIG. 5E.

Because of the consideration of long-term conditions, the system of the present invention responds very rapidly to changing conditions, but the permitted range of response is limited, more so than it would be if only a single time constant is utilized in the averaging means. The system tends to keep the response in the range of the value maintained in the long range averager 59. This makes the system of this invention smoother than a single time-constant system could be (due to the long range averaging), yet faster to respond to a rapid, small changes in conditions.

Figure 6:
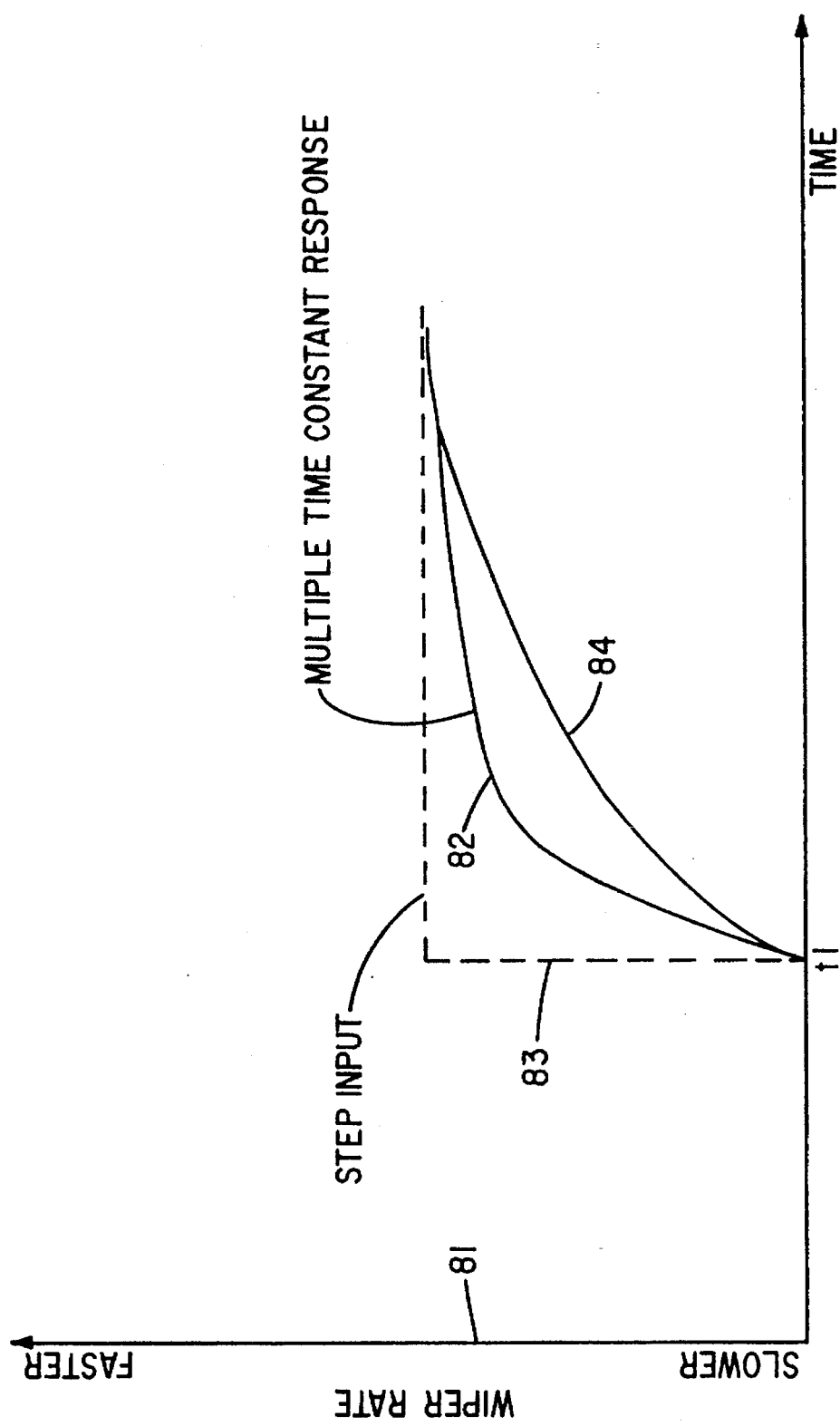
FIG. 6 are curves illustrating the response of the system of the present invention to a step function input.

The response of the system to a step function change in rain intensity is illustrated in FIG. 6. At time $t_1$ the system encounters the step function stimulus which warrants operation of the wipers in a steady slow fashion. The medium range averager 59 will respond very quickly, so the system will very quickly achieve a fast intermittent speed (a rate above the level identified by numeral 83). The long range averager 59 will respond more slowly, and the system will then shift into a steady slow mode of operation. There is in effect a "knee" as at 82, in the time-domain response. It may also be said that the system very quickly responds to a level which, while not optimal, is not objectionable. The system then smoothly "fine tunes" itself to the optimal level.

For purposes of illustration, the response of a typical prior art system is superimposed on FIG. 6 as curve 84. Without the benefit of the response knee 82, the resulting single time constant will be subjectively too sluggish or too erratic. Quantitative experiments reveal that the present system is, in fact, 66% smoother than prior art systems, with smoothness being taken as the ratio of standard deviation to mean wipe period for a large number of wipes. Also, the present system is simultaneously 20% more rapid to respond to step function changes in rainfall flow rate, where the response time is measured to 90% of settled, as is customary in the electronics industry.

Mode of Operation

The actual mode of operation of the wipers is based on the rain intensity (RN_INT) estimate at the output of summing means 71 of FIG. 4. This is coupled to a functional block 73 that, by way of the vehicle interface 14, runs the windshield wipers 4 at a rate appropriate for the conditions. For small values of rain estimate, the wipers are run in an intermittent mode, with long delay times between actuations. If the rain intensity is higher, the delay time between wipes is made shorter. If the rain intensity should exceed a threshold, the wipers will commence operation at a steady slow speed, with no delay between successive wipes. If the rain intensity exceeds a value higher still, the wipers will operate at a higher rate of speed. To further prevent erratic behavior, there is considerable hysteresis among the slow and high speed thresholds.

Figure 7:
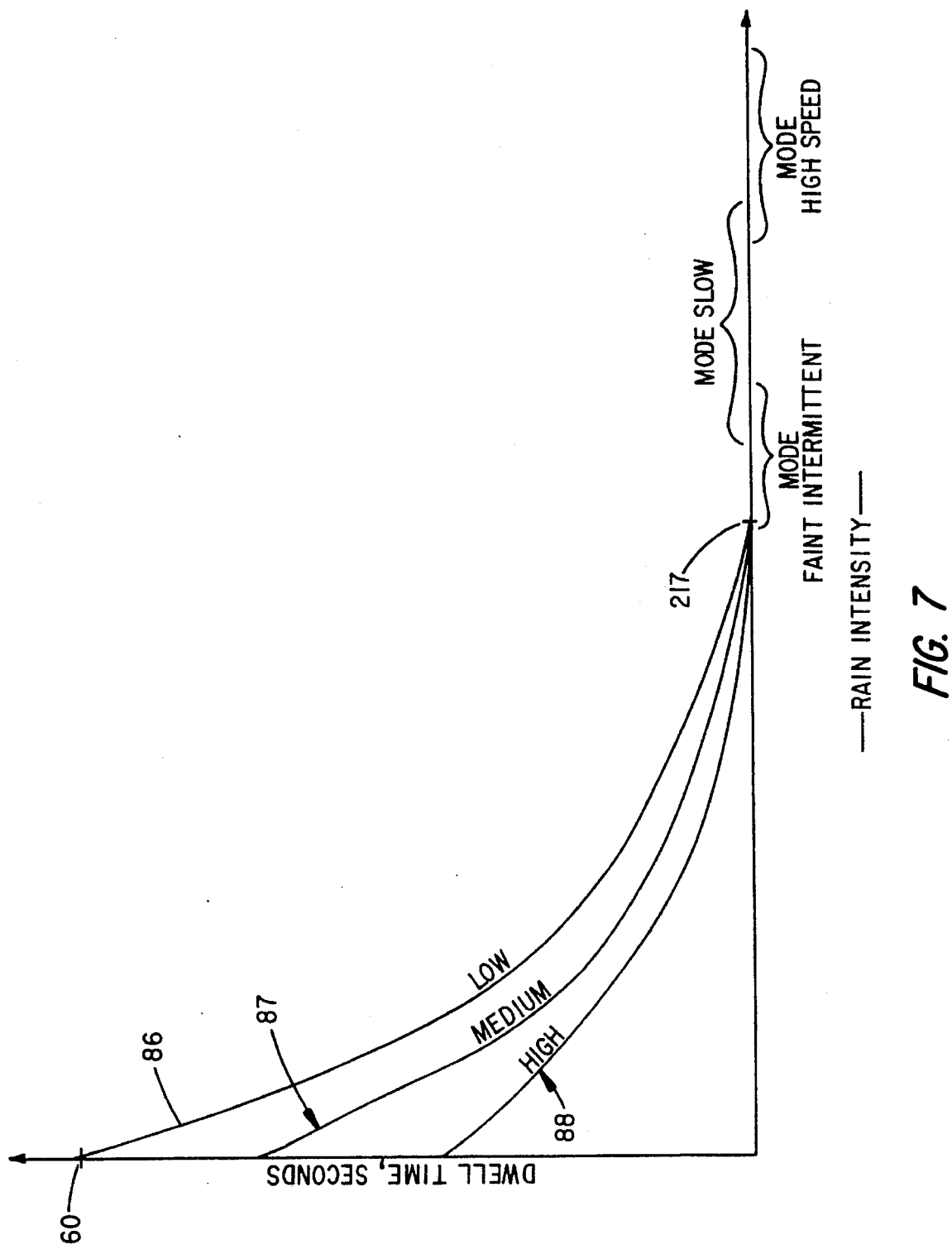
FIG. 7 is a plot of wiper dwell time vs. rain intensity for the system of the present invention.
Figure 8A:
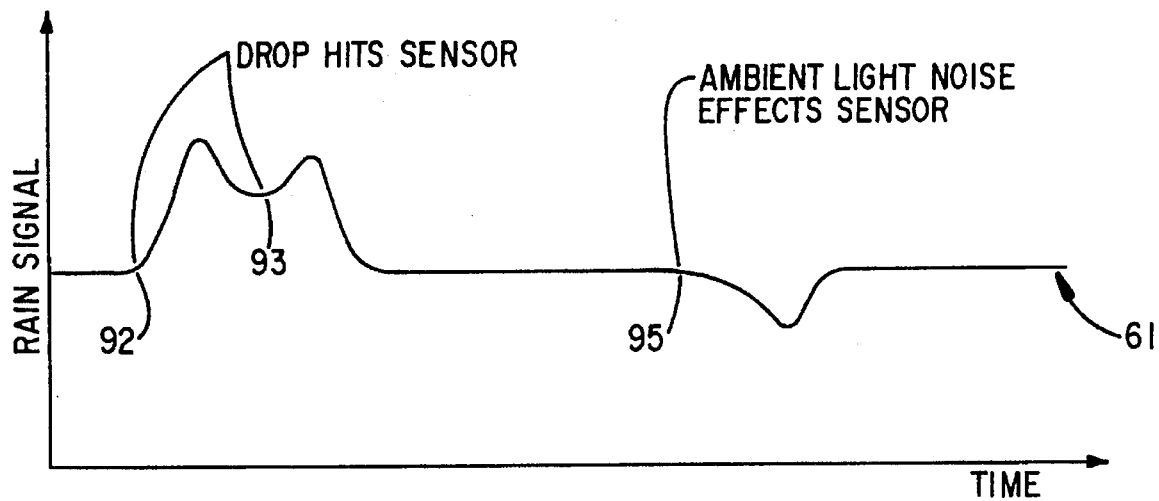
FIG. 8A is a plot of the rain sensor output vs. time.
Figure 8B:
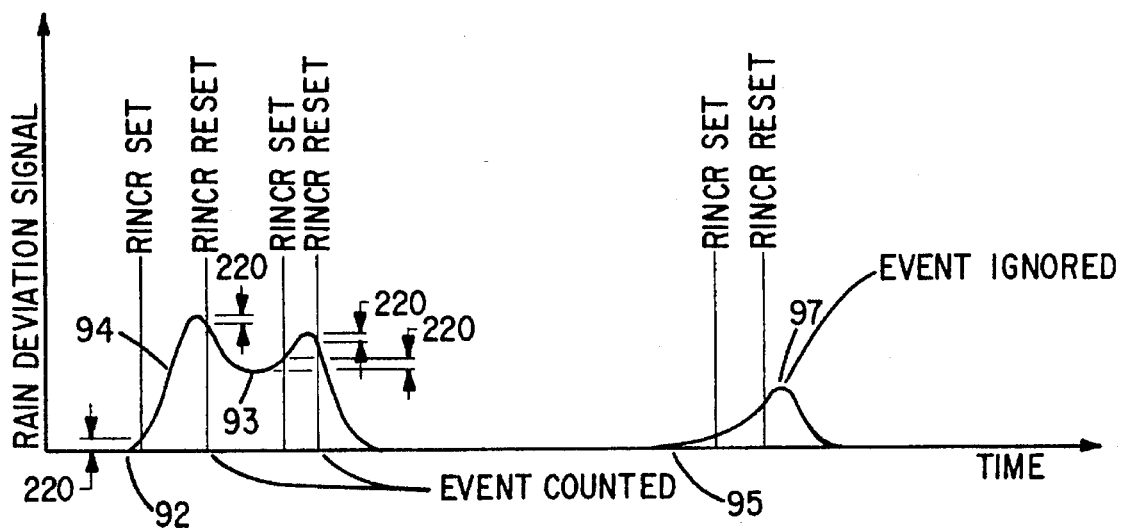
FIG. 8B is a plot of the rain deviation signal vs. time.
Figure 14:
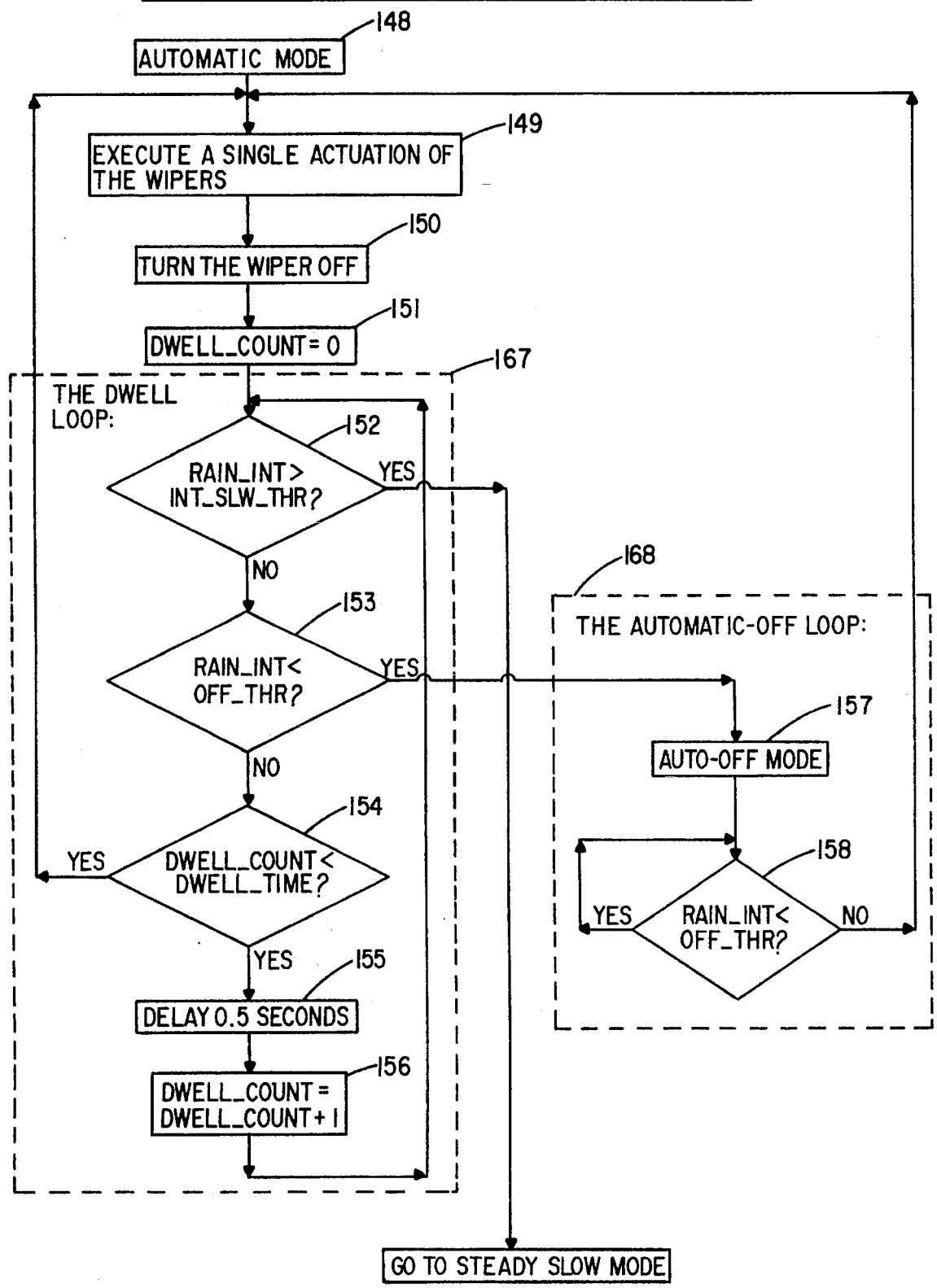
FIG. 14 is a software flow diagram for the background wiper mode control when the wiper system is in its automatic mode.
Figure 15:
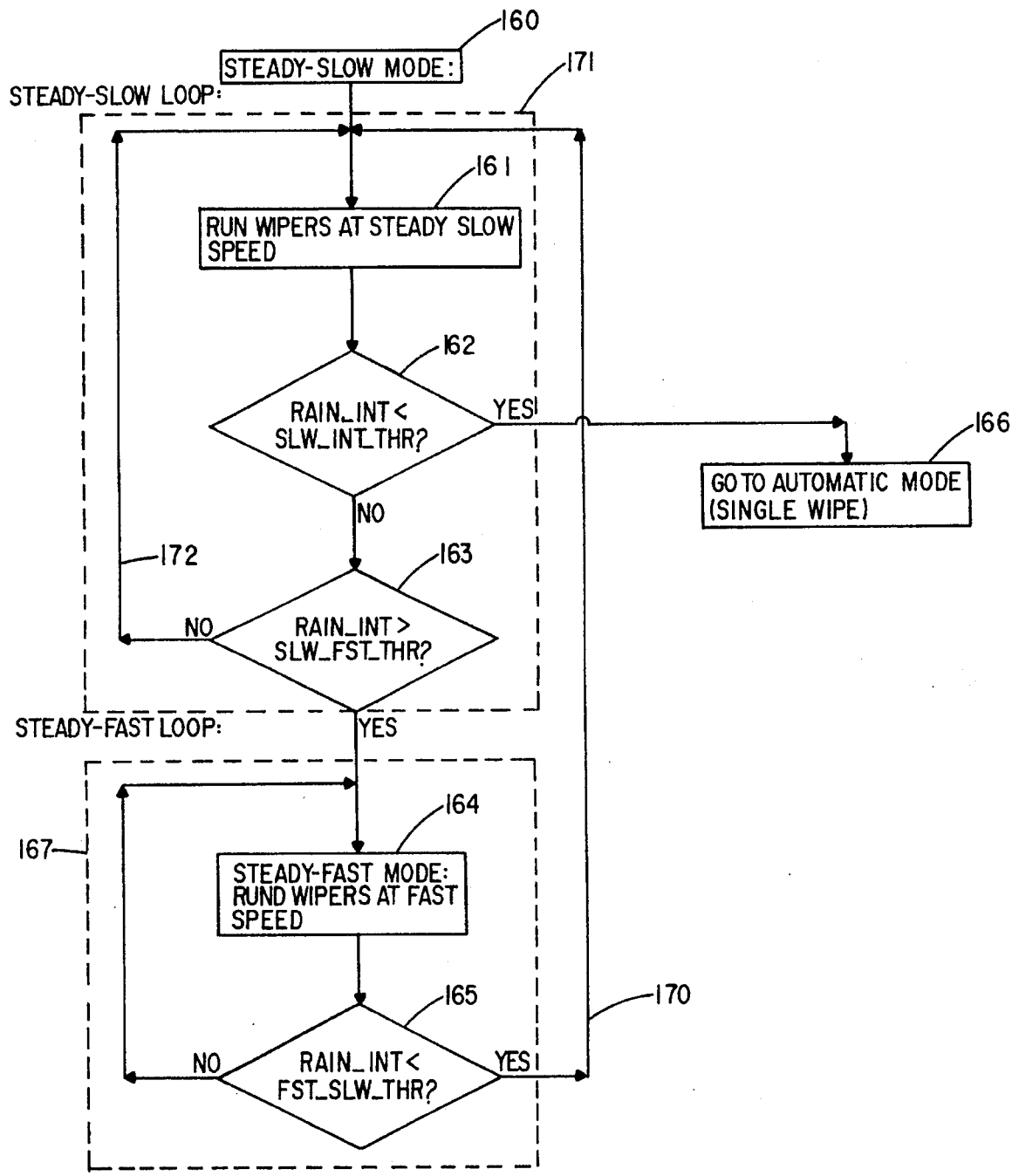
FIG. 15 is a further software flow diagram for system operation in the steady-slow and steady-fast modes.

The characteristics of the mode determination are illustrated as a graph in FIG. 7, and flow charts detailing its microprocessor implementation are presented in FIGS. 14 and 15. The effects of the hysteresis between the fast and slow speeds is illustrated for a typical signal in FIG. 8D. (Note that this signal does not correspond to the same signal set forth in FIGS. 5A–5F, or that of FIGS. 8A–8C.) In FIG. 8D, the vertical axis of the graph is the overall weighted average of rain intensity at 72 in FIG. 4, as computed previously, and the horizontal scale spans about twenty seconds of time. As can be seen, the initial value of rain intensity between $t_0$ and $t_1$ is above the threshold 226 for operation in a slow, intermittent mode, and below the threshold 229 for a transition from slow to fast mode of operation. Thus the vehicle interface will operate the wiper motor at a steady slow speed. Although the rain intensity signal at 72 fluctuates considerably, it does not cross the threshold 228 for a transition from slow to fast speed until time $t_3$, whereupon the wiper motor 13 will commence operation at a steady fast speed of operation. From this point forward, the rain intensity signal at 72 remains above the threshold 229 for transition from fast to slow operation. Thus the wiper motor 13 will continue to operate at a fast speed, despite fluctuations below the slow-to-fast threshold 228.

It is clear from examination of FIG. 8D that were there but a single threshold (for example, at 91) to determine operation in slow or fast speeds, without the benefit of the illustrated hysteresis, the illustrated signal would have resulted in several additional transitions between slow and fast speeds. This would be judged by the driver to be erratic operation. The present invention may be thought of as maintaining a propensity to operate at a single speed.

Values of rain intensity below the intermittent/slow threshold will naturally require that the mode determination block 73 incorporate some means for computing an appropriate dwell time. The methods for actually implementing such a dwell time are inherently linear in nature. A microprocessor may, for example, be programmed to implement a delay of some variable number of seconds. This linear implementation of time is incongruent with normal human perception, in a manner similar to the example of human perception of flux previously described.

Thus, in order to accommodate normal human perception, and to compensate for the logarithmic nature introduced in the value-to-intensity conversion block 48, the present invention employs a means in block 73 for converting logarithmic intensity to linear time. This behavior is illustrated in the curves of FIG. 7. The input to block 73 is the overall weighted average of rain intensity at the output of summing means 71, and is plotted on the horizontal axis in FIG. 7. The output of this functional block is exponential in nature with decreasing input. A software means for implementing this behavior is set forth in the flow chart of FIG. 13. Also, in this invention, the computed wipe period is multiplied by a constant which changes with the sensitivity input provided by the driver. This feature is illustrated in the family of curves 86–88 set forth in FIG. 7, and further accommodates driver preferences.

Smooth operation in the transition between intermittent and steady slow speeds is a also consequence of this control strategy. Observe that if the rain intensity signal illustrated in FIG. 8D were to drop just below the intermittent/slow threshold 226, the resulting computed dwell time would be zero or some small value. A transition from steady slow to, say, one half second of dwell between wipes, is not objectionable to the driver. Thus, the driver will perceive the operation of the system as smooth, even with modest fluctuation of the rain intensity signal.

Any rain sensor 1 mounted within the path swept by the wipers 4 must deal with the effects of the wipers passing over the sensor. In the present invention, if the dwell period between wipes is long (say three or more seconds) it is proposed that data from the rain sensor be ignored while an actuation of the wipers is in progress. Further, in such a situation the currently maintained short, medium and long range averages of rain intensity should be held constant for that time.

For shorter computed dwell times, this method would prove undesirable in that it would ignore a large percentage of the data coming from the rain sensor. Thus, the present invention features a means of ignoring a certain number of rain-detection events after the start of an actuation of the windshield wipers. This roughly compensates for the effects of the wet wipers traversing the sensor. Should the wiper blades be dry, thus not generating a large signal when traversing the sensor, the proposed method will overcompensate, causing the system to forget legitimate rain events. This is desirable, because the fact that the wipers are dry, and thus prone to smearing, is valuable information that should not be discarded. Further, the invention requires no synchronization to the exact moment the wipers pass over the sensor.

Instant Response to Sensitivity Changes

It is desirable that the system respond instantly to changes in the sensitivity level of the system established by the vehicle's driver. Thus, should the driver increase the sensitivity, the ongoing medium and long range averages applied to summing means 71 are immediately increased. Conversely, if the driver decreases the system sensitivity, the system will instantly decrease these averages. This feature has the effect of immediately changing the behavior of the system upon reception of a new desired sensitivity. The driver need not wait for the time constants in the averaging means to reach a new level. A method for the software implementation of this feature is set forth in the flow chart of FIG. 16.

The above description generally illustrates the desired behavior of the functional blocks which make up the wiper control system of the present invention. FIGS. 9–15 comprise a number of flow-charts, which describe a detailed description of the invention based upon a programmed microcontroller implementation. One skilled in the art of programming will see that the accompanying flow charts teach a detailed method of implementing the smoothing algorithm set forth in the block diagram of FIG. 4. The symbols of the flow chart may be implemented in some direct machine-executable language, such as assembly code, or with the aid of some higher-level compiled language, such as "C." For convenience, set forth below in Table I is a listing of variables used in the flow charts and Table II identifies constants identified in these same flow charts. Some of these variables correspond directly to digital signals illustrated on the smoothing algorithm overview block diagram of FIG. 4. Variable and constant names appear in upper case.

TABLE I

| | Table: variables used in the accompanying flow charts | Ref No. |
|---|---|---|
| RAIN | The results of the analog-to-digital conversion of the moisture-sensing signal. (This corresponds to the signal referred to as "the moisture sensing signal.) | 41 |
| RC_RN_VAL | Recent Rain Value. This is the total number of events in the First-In, First out shift register 45. | 47 |
| RC_RN_INT | Recent Rain Intensity. | 49 |
| MRA | Medium-Range Average of the Recent Rain Intensity. (This is a sixteen bit quantity considered to range between zero and one.) | 58 |
| LRA | Long-Range Average of the Recent Rain Intensity. (This is a sixteen bit quantity considered to range between zero and one.) | 70 |
| RAIN_INT | Rain Intensity. This is essentially the output of the rain-intensity sensing portion of the algorithm. It is a weighted average of the medium and long-range averages. | 72 |
| DWELL_TIME | Dwell Time is the nominal delay between actuations of the wiper, and is computed based on the RAIN_INT. Given in units of half-seconds. | FIG. 7 |
| BLANK_CNT | A counter used to time periods wherein rain sensor data is ignored. | 200 |
| RINCR | Rain Increasing. A flag used in rain event detection. | 201 |
| RC_XTRM | Recent extreme of rain deviation. Used to extract maxima and minima of the rain deviation signal for purposes of event detection. | 202 |
| RAIN_DEV | The deviation of the moisture sensing signal from its nominal quiescent value. | 203 |
| SFIFO[0] | Summation First-In, First Out shift register array. | 205 |
| . . . | | |
| SFIFO[4] | | |
| SNS_VAL | Sensitivity Value. A number between 0 and 4 inclusive which indicates the setting of the driver-accessible sensitivity control. | 206 |

TABLE I-continued

| Table: variables used in the accompanying flow charts | | Ref No. |
|---|---|---|
| NOISE | The results of the analog to digital conversion of the disturbance sensing signal | 207 |
| OLD_SNS_VAL | The previous reading of sensitivity value. | 210 |
| DWELL_COUNT | Used by the microprocessor to generate delays of DWELL_TIME. Thus, it increments every one-half second. | 212 |
| NOISE_DEV | The absolute value of the deviation of the noise signal from its normal quiescent value. | 214 |

TABLE II

| Table of constants used in accompanying flow charts: | | Ref No. |
|---|---|---|
| K_INT | Multiplying constant used in value-to-intensity conversion. Adjusted so that RC RN INT has an appropriate range of values to optimally utilize 8 bits of resolution. | 215 |
| K_SBIM | Constant added to SNS_VAL in value-to-intensity conversion so that an appropriate range of adjustment is permitted to accommodate driver sensitivity preferences. | 216 |
| K_DW_BP | Dwell Breakpoint Constant. Above this value of rain intensity, the nominal dwell time should be zero. Set to approximately the same value as SLW_INT_THR 227. | 217 |
| K_DW_EXP | Multiplying constant used in the exponential conversion of rain intensity to dwell time. | 218 |
| K_DW_MUL | Multiplying constant used to adjust the result of the conversion to dwell time to a suitable range of values. | 219 |
| K_ET | Event Threshold. Excursions of the sensed rain signal must be at least this many units to be considered valid rain events. | 220 FIG. 8 |
| K_ATT_MRA | Attack constant for the medium range average. | 221 |
| K_DEC_MRA | Decay constant for the medium range average. | 222 |
| K_ATT_LRA | Attack constant for the long range average. | 223 |
| K_DEC_LRA | Decay constant for the long range average. | 224 |
| OFF_THR | Off threshold. When RAIN_INT is below this value, the mode control program enters the Automatic-off mode. | 225 |
| INT_SLW_THR | Intermittent to Slow Threshold. Used to determine when the wiper system should transition from intermittent to a steady slow mode of operation. The next three thresholds are similar in their definitions: | 226 FIG. 8D |
| SLW_INT_THR | Slow to Intermittent Threshold | 227 |
| SLW_FST_THR | Slow to Fast Threshold | 228 |
| FST_SLW_THR | Fast to Slow Threshold | 229 |
| K_LDTH | Large Drop threshold. Deviations of the sensed moisture signal which are larger than this threshold are considered to count as two events. | 230 |

EVENT DETECTION

Figure 9:
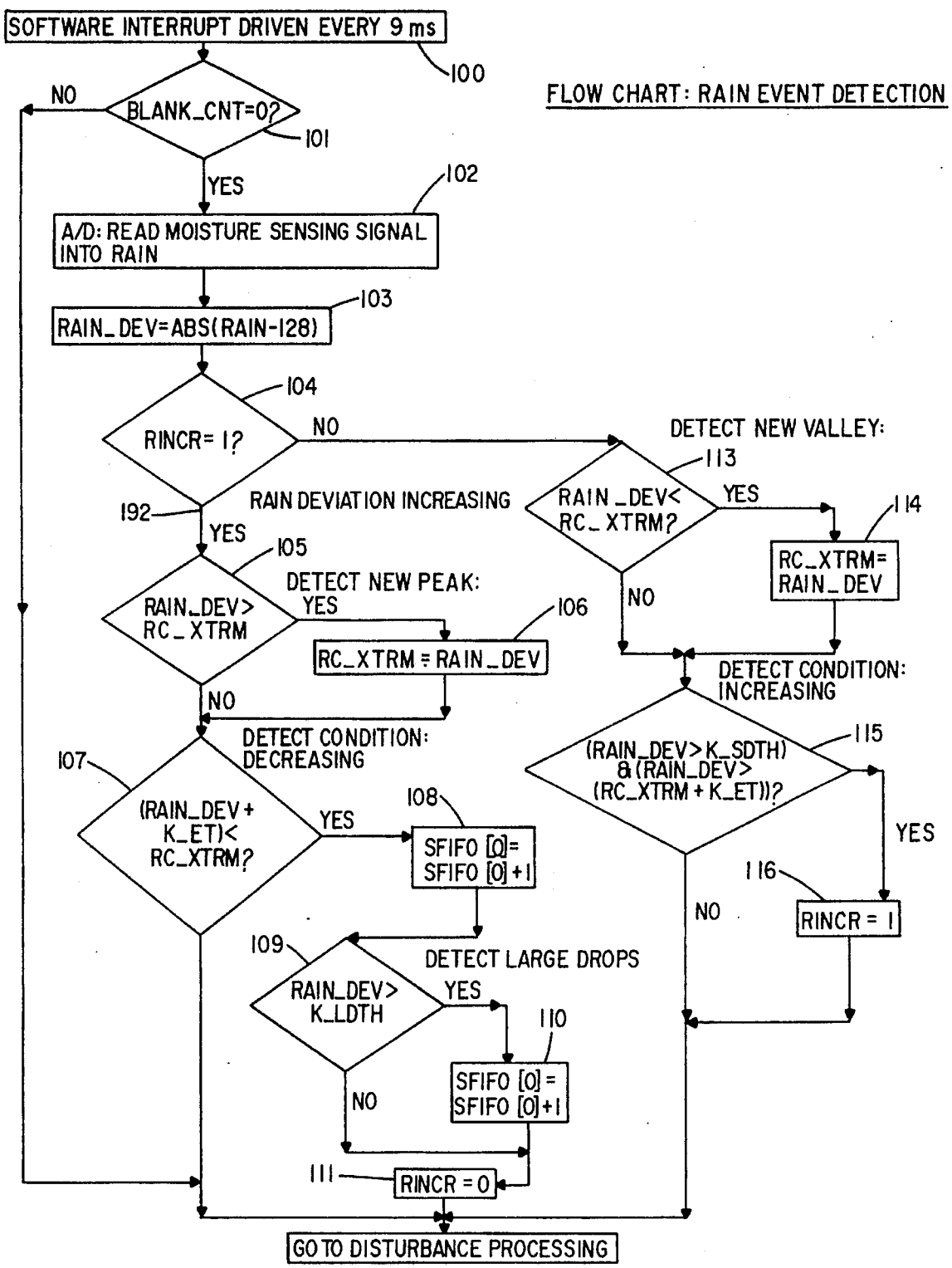
FIG. 9 is a software flow diagram depicting rain event detection.

As can be seen from block 100, in the flow chart of FIG. 9, every 9 milliseconds the microcomputer performs a software interrupt, whereupon the steps comprising the method employed for detection of rain events is initiated. This sampling period corresponds to a sampling frequency of about 110 Hertz, and it can also be used to generate appropriate infrared emitter timing pulses, as described in the aforereferenced U.S. Pat. No. 5,059,877. The generation of these pulses is independent of the smoothing method described here, and, thus, is not illustrated.

Upon execution of the software interrupt (block 100), the microcomputer implements a decision block 101 which permits the bypassing of the rain event detection code. As illustrated, when the variable BLANK_CNT (Table I, Ref. 200) is nonzero, rain events are ignored. This variable may be set in the overall mode control program (FIGS. 14 and 15) during the execution of a single actuation of the wipers (block 149). The purpose of this implemented feature is to prevent the retriggering effect of the windshield wipers sweeping water over the rain sensor leading to an excessively high estimate of the rain intensity.

At block 102, the microcomputer has implemented the software interrupt and determined that the data from the sensor is not to be ignored, and the A/D converter reads the moisture sensing signal into the appropriate variable RAIN at 41 in FIG. 4. In the following block 103, the deviation (RAIN_DEV; Table I, Ref. 203) of the sensed rain signal from its nominal quiescent value 61 (FIG. 5A) is extracted, using an absolute-value function. A typical digitized rain signal and resulting deviation (RAIN_DEV) are illustrated in FIGS. 8A and 8B, in order to illustrate the process of event detection.

At this point, a decision block 104 implements different code, based on whether the RAIN_DEV signal was previously increasing or decreasing. This information is maintained in a bit flag, RINCR (Table I, Ref. 201). If the rain deviation is increasing, the operations expressed in blocks 105 and 106 are executed to search for a new recent extreme maximum value of the rain deviation signal, RC_XTRM (Table I, Ref. 202). Thus implemented, RC_XTRM peak detects the rain deviation signal. The next decision block 107 looks for a reversal of the rain deviation signal towards zero. It does this by ascertaining that a the rain deviation signal (RAIN_DEV) is less than the recent extreme value (RC_XTRM) by at least the value of a threshold, K_ET (Table II, Ref. 220). It is this reversal from a peak excursion of the deviated rain signal which we define as a "rain event." Upon detection of this rain event, the function performed at block 108 increments the first stage of a summing first-in, first-out shift register 45 (FIG. 4), SFIFO[0].

The next executed decision indicated by block 109 compares the deviation of the rain signal 203 (RAIN_DEV) against a threshold, K_LDTH (Table II, Ref. 230). Excursions in excess of this threshold may be considered to have originated as the result of larger raindrops, and are thus counted a second time into SFIFO (0). See functional block 110. Thus, the operations represented by blocks 109 and 110 have the effect of weighing the response to the rain events by the size of the rain signal excursion. This represents something of a compromise with the purely amplitude dependent schemes of prior art approaches. Additional sensed levels may be implemented by cascading sets of blocks similar to 109 and 110, each set implementing a different threshold. It has been found that four such sets, only one of which is illustrated, is sufficient.

Next, the RINCR flag (Table I, Ref. 201) is reset to zero (block 111). This signals the program so that on the next pass through, the RAIN_DEV signal is considered to be decreasing. Program control now passes on to the disturbance processing block 112 in FIG. 10.

With continued reference to FIG. 9, as mentioned above, in the case where the recent RAIN_DEV signal has been decreasing is handled differently at decision block 104. In such a case, new valleys in the recent rain deviation variable are detected by way of decision block 113 and function block 114. These valleys are stored as the variable RC_XTRM (Table I, Ref. 202), which in this context now means an extreme valley, rather than an extreme peak. Next, a decision indicated by block 115 detects if the rain deviation variable has begun increasing towards some new peak again, by at least the amount of the event threshold, K_ET (Table II, Ref. 220). If this is the case, at operation block 116 the flag RINCR is set to indicate that the rain deviation is now increasing. It can be said that the system is once again armed to detect another rain event. In all cases the program proceeds with disturbance processing 112 (FIG. 10).

Referring to FIG. 8A, the process for detecting an event may be illustrated as follows. At the start of the graph the rain deviation is zero, and the flag RINCR is reset. The time span of the illustration is taken to be about two seconds, so the software interrupt (block 100 of FIG. 9) occurs hundreds of times over the course of the graph. At the beginning of the graph in FIG. 8B, at each pass through the event detection flow chart (FIG. 9) decision block 104 selects the "yes" branch which will subsequently look for a condition where the rain deviation is increasing (block 105). When a drop of water impinges upon the sensor (as at time 92 in FIG. 8B), the digitized rain signal (RAIN) begins to deviate from the quiescent level 61. This results in a rain deviation (RAIN_DEV) signal which increases by more than the threshold K_ET (Rain event threshold constant), whereupon block 116 will set the flag RINCR, arming the system for a reversal detection.

The RAIN_DEV signal continues to rise until it peaks and proceeds back towards zero. Once it has decreased an amount set by K_ET, the event is detected and flag RINCR is reset at block 111. In the illustration of FIGS. 8A and 8B, a second drop (at time 93) causes an excursion of the rain deviation signal which is at least a threshold value K_ET greater than the lowest valley 94 in the signal (held by RC_XTRM). Thus, this is also detected as an event. Note that it is not necessary for the rain deviation signal to drop below a fixed threshold in order to detect a new event; the method illustrated detects reversals.

DISTURBANCE PROCESSING

Figure 10:
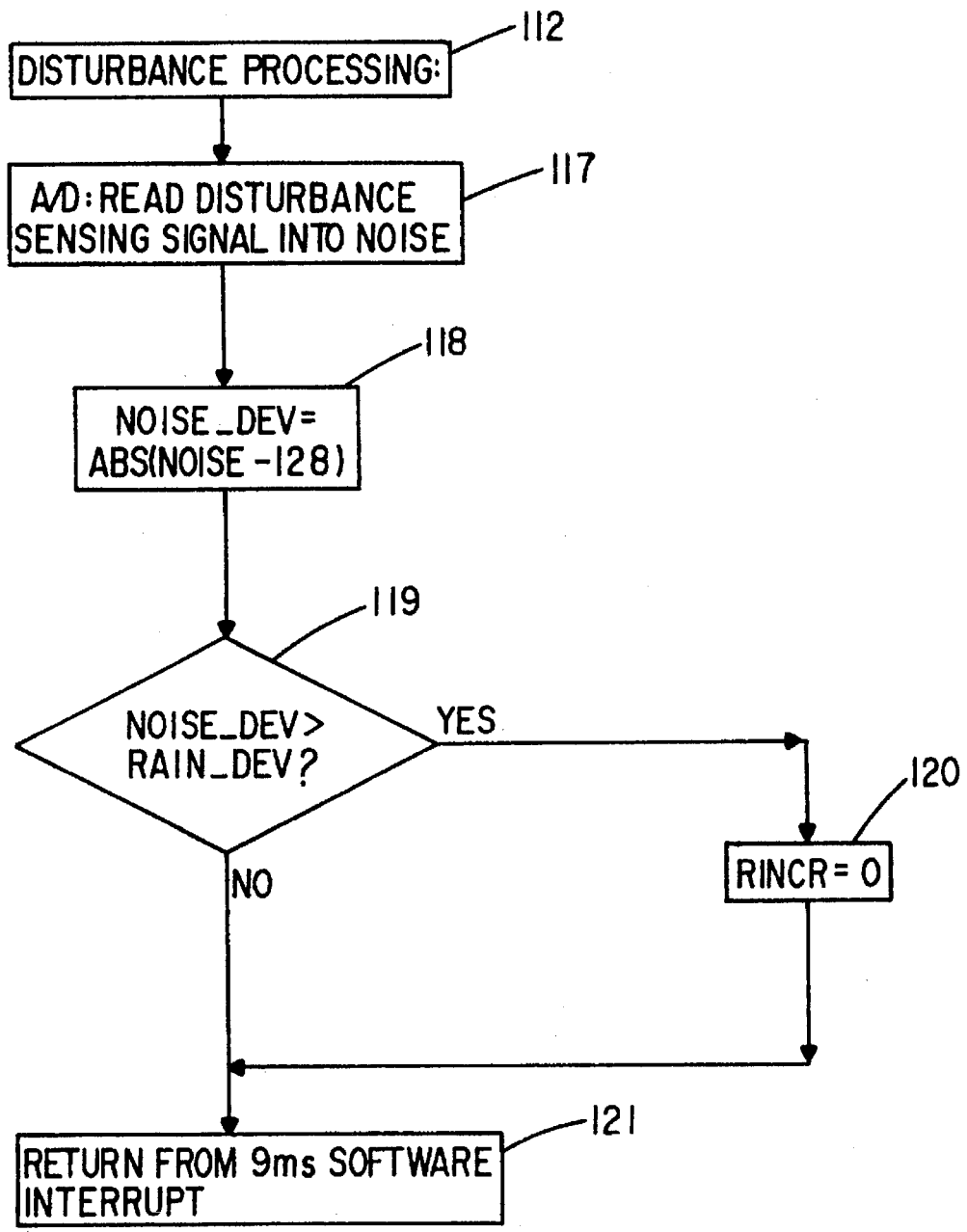
FIG. 10 is a software flow diagram relating to disturbance processing.

As shown in the flow chart of FIG. 10, and continuing the 9 millisecond software interrupt, block 117 utilizes the A/D converter 11 (FIG. 4) to read the value of the disturbance sensing signal into a variable "noise deviation" "NOISE" (Table I, Ref. 207). The operation called for at block 118 then computes the absolute value of the deviation of this variable from its nominal value, leaving the result in the variable "noise deviation" NOISE_DEV (Table I, Ref. 214). This variable is then compared against the rain deviation variable. (See block 119.) If the magnitude of the noise deviation exceeds that of the sensed rain deviation, the authenticity of the rain event in progress is suspect. That is, it is plausible that a sharp shadow or supply voltage fluctuation initiated the current deviation of the rain signal in progress. Thus, in such case, the operation indicated by block 120 resets the flag RINCR to zero. This has the effect of discounting the rain deviation in progress.

Next, and in all cases if the rain deviations exceed the disturbance deviations, the program returns from the 9 millisecond software interrupt (block 121).

Figure 8C:
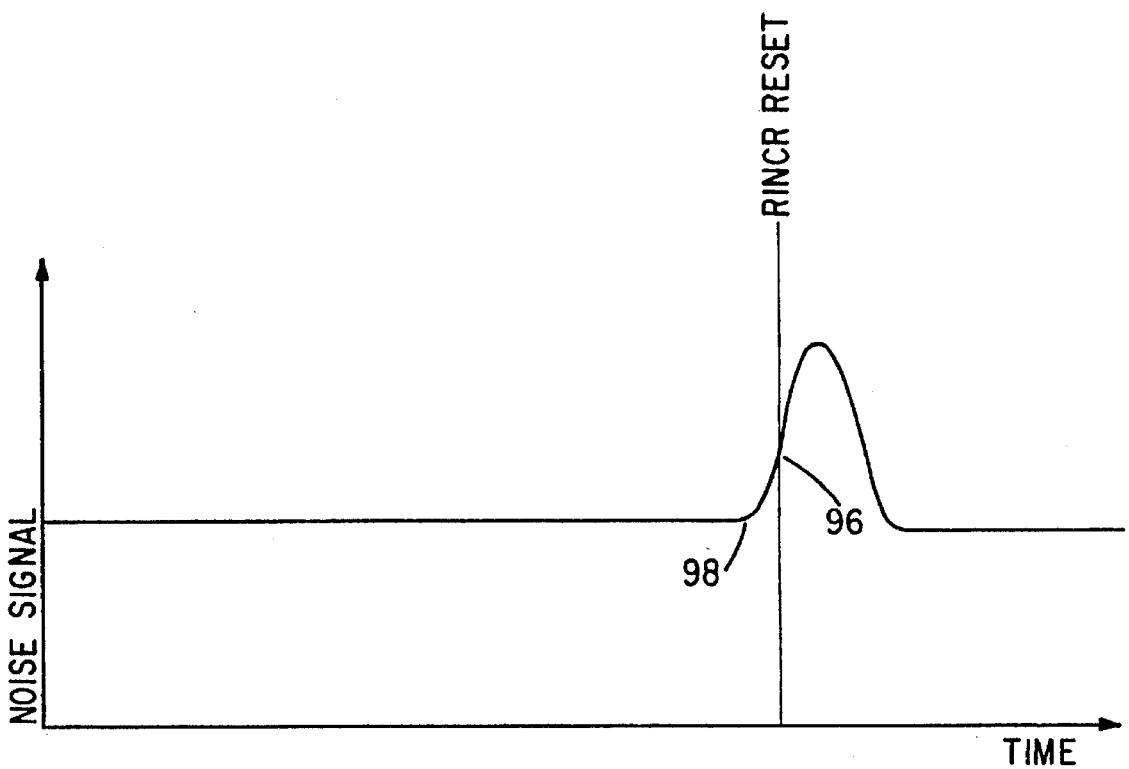
FIG. 8C is a plot of a hypothetical noise signal vs. time.
Figure 8D:
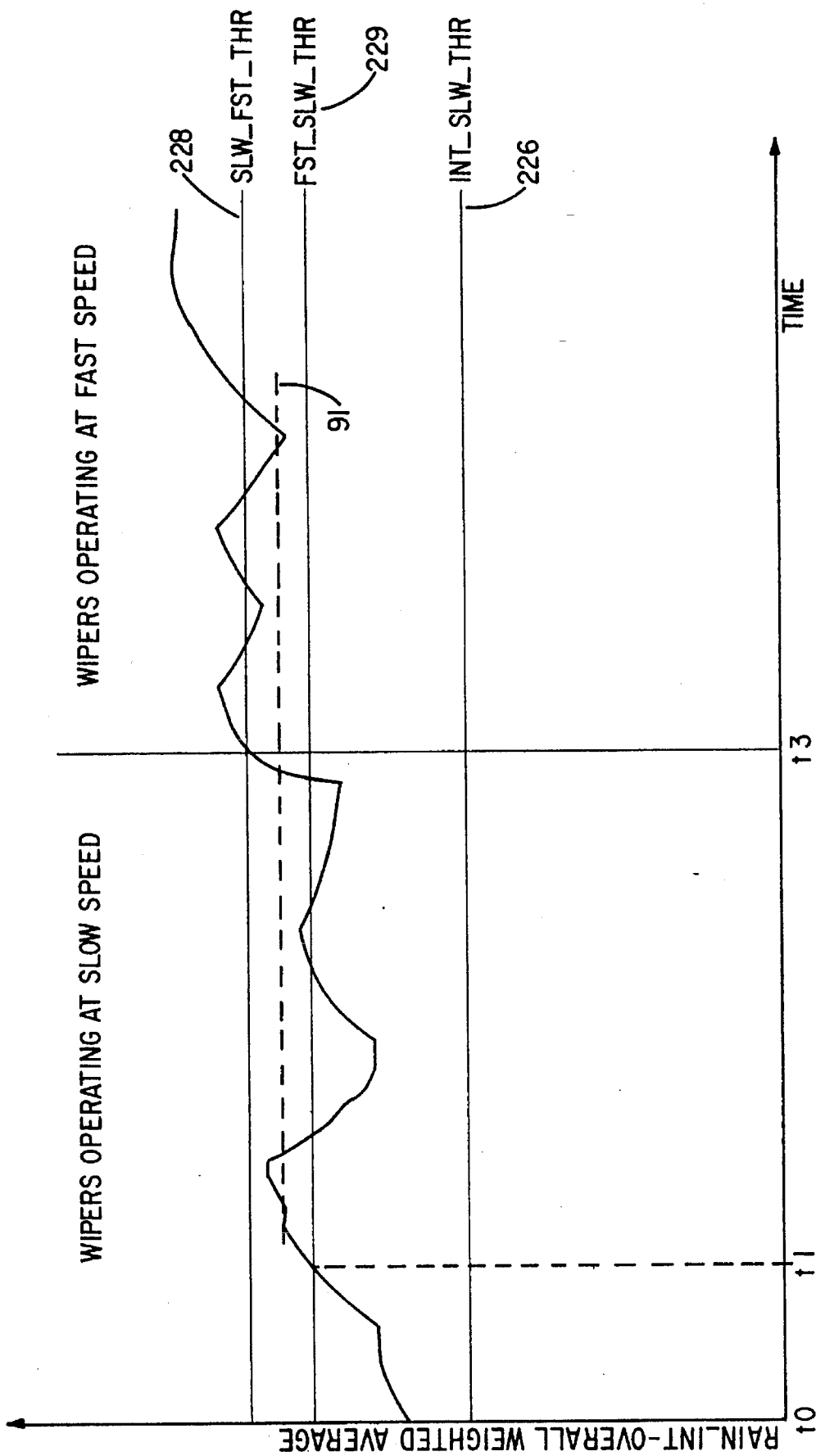
FIG. 8D is a plot of the overall weighted average of rain intensity vs. time illustrating the effect of hysteresis in mode selection.

The effects of a typical disturbance event is also illustrated in FIGS. 8A and 8C. In the graphs, at a time indicated by numeral 95, a sharp shadow sweeping across the sensor 1 causes a change in the digitized rain sensing signal (RAIN). A short time later (at 98 in FIG. 8C), this same disturbance effects the noise sensing signal (NOISE). Note that in this example, selected to illustrate a particularly troublesome case, disturbance event at time 95 actually modulates the rain signal on line 41 just before it affects the noise sensing signal (NOISE). Because the disturbance signal deviation (NOISE_DEV) exceeds the rain signal deviation (RAIN_DEV) at time 96 before the reversal of the rain deviation signal at time 97, the RINCR flag is reset, and, thus, no rain event is counted.

If suitable delays (not illustrated) are added in the acquisition of the variable, RAIN, then all disturbances close in time to rain events can cause rain events to be ignored, including those that occurred just before the disturbance. The technique is described in detail in U.S. Pat. No. 5,059,877 referred to earlier.

SUMMATION AND FIFO

Figure 11:
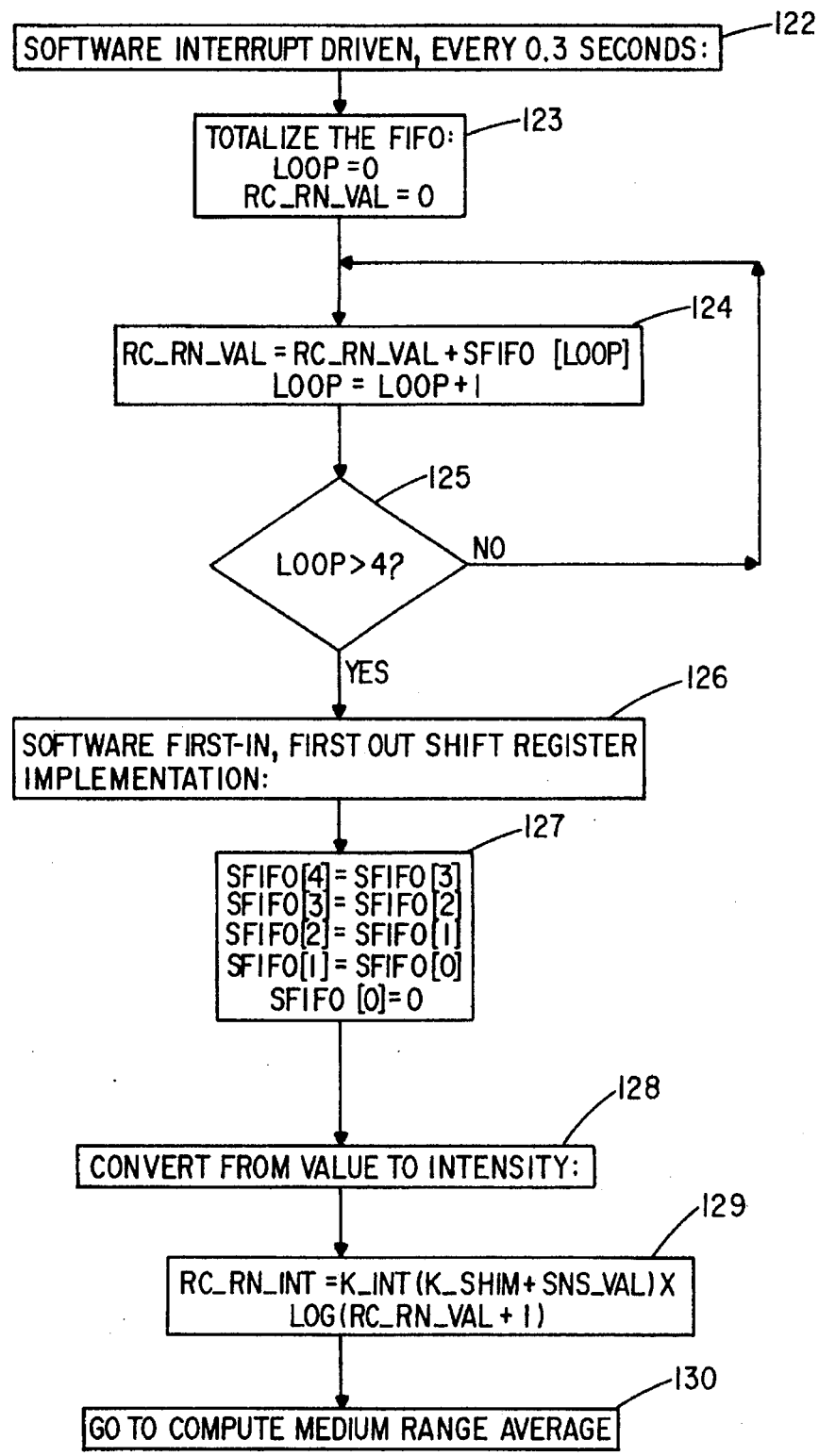
FIG. 11 is a software flow diagram for the event summation, buffering and intensity conversion employed in the implementation of the present invention.
Figure 13:
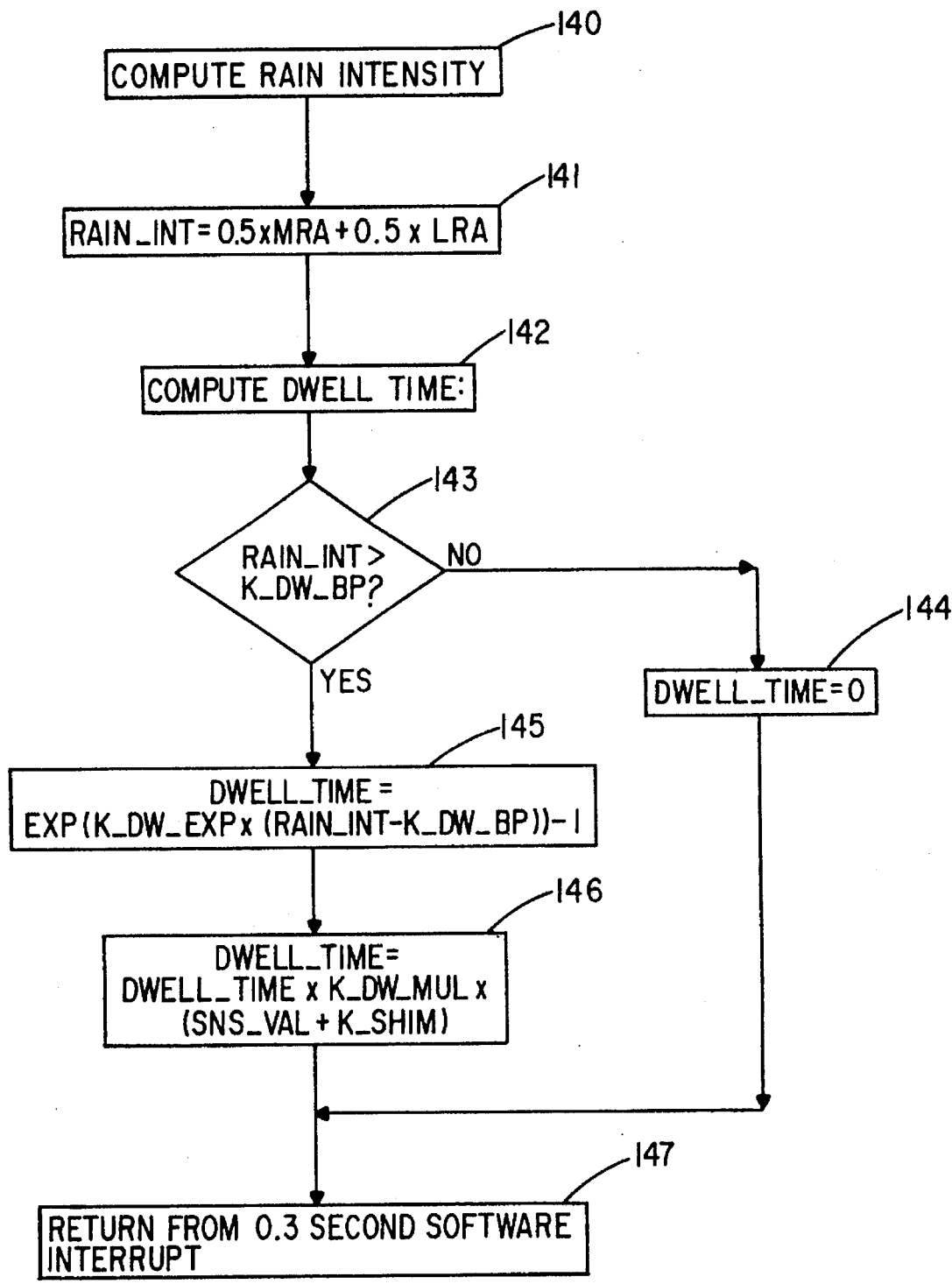
FIG. 13 is a software flow diagram for rain intensity and dwell time calculations.

Rain events, when detected as described above, may occur many times in a second, depending on the conditions and sensed area. Thus, it is necessary to perform the routine many times each second. The remainder of the rain intensity estimation method may occur with relative infrequency, as it is not necessary to re-adjust the speed of the wipers more than a few times per second. Thus, the rest of the rain intensity estimation method, as depicted in the flow charts of FIGS. 11 through 13, is performed every 0.3 seconds, driven by a software interrupt.

Upon reception of the software interrupt (block 122, FIG. 11), the operations indicated in the three functional blocks 123, 124, 125 serve to total all of the counts in all of the stages of SFIFO 45, leaving the variable RC_RN_VAL (Table I, Ref. 47). This quantity is here referred to as "recent rain flux value," as opposed to intensity, because no compensation of the effects of human perception has yet been factored in.

Next, each stage of SFIFO 45 is shifted to the next higher stage. The lowest stage, SFIFO[0] is reset to zero. This operation is shown in operation block 127 of FIG. 11, and effectively implements the first-in, first out shift register.

With reference to block 129, the above-obtained rain value, which may be thought of as "events per unit of time," is converted to an intensity value. The operation represented by functional block 128 imparts a logarithmic characteristic to the value, causing the resulting quantity, RC_RN_INT (Table I, Ref. 49), to match human perception of rainfall intensity. This recent rain intensity value is increased with increased settings on the driver-accessible sensitivity control, as depicted in the FIG. 2, as part of the driver accessible switch 15. This feature, in some measure, accommodates driver preferences. That is, one driver might judge a condition to be a "light rain," while another driver may consider the same condition to be a "heavy downpour." The modulation of Recent Rain Intensity with sensitivity changes represented by block 129 reflects these differing opinions.

MULTIPLE TIME-CONSTANT AVERAGING+

The output of the above value-to-intensity conversion, RC_RN_INT, thus matches human perception of rainfall intensity, but it fluctuates considerably due to the restricted sample size available to the detector. Referring to FIG. 12, a medium range averaging operation is performed on the recent rain intensity (RC_RN_INT), as depicted in blocks 131–134. These operations produce an output, MRA (Medium Range Average) which asymptotically approaches the input value, RC_RN_INT. This characteristic is similar to that provided by a resistor-capacitor filter 57, as illustrated in the schematics of FIG. 4. As indicated, the implemented filter has a relatively short response to new rainfall, or a short attack time, of about 1.2 seconds. The recovery of the filter in the absence of rain, or the decay time, is longer at about 5.5 seconds. Thus, the output of block 56 in the overview schematic of FIG. 4 provides an estimate of the medium-range rainfall conditions, averaged over a preceding several seconds.

As previously discussed, no single combination of asymmetric attack and decay time constants can satisfactorily implement a filter which is judged simultaneously smooth and responsive. Thus, the output of the medium range averager 56 (MRA) is transferred to the input of a long range averager 59. The purpose of the long range average, implemented by the operations represented as blocks 135–139 in FIG. 12, is to estimate the prevailing conditions under which the sensor is operating. In a similar fashion to that of the medium range average, the long range averager provides asymmetric asymptotic attack and decay constants. As this is fed from the output of the already-smoothed medium range averager 56, the resulting time constants are on the order of ten seconds or so. The system may alternatively be implemented with the long range averager 59 in parallel with, rather than in series with, the medium range averager. This would require longer time constants in the long range averager. It is necessary to maintain 16 bits of resolution for both the long and medium range averagers, in order to implement the long time constants required.

RAIN INTENSITY AND DWELL TIME

With medium and long range averages of rainfall intensity established, the smoothing algorithm proceeds to construct an overall estimate of rainfall intensity, RAIN_INT. This quantity is the average of the medium and long range averages as performed by operation block 141 in the flow chart of FIG. 13. The resulting quantity, RAIN_INT, provides the desirable bounded response to rapid changes in conditions, while maintaining some consideration of long-term prevailing conditions. Subsequent determinations of wiper activity in automatic modes of operation are based on this quantity.

For resulting rain intensities which lie below a threshold K_DW_BP (Table II, Ref. 217), it will be desirable to operate the windshield wipers with some dwell time between wipes. Specifically, the next step taken by the microcontroller, as shown starting at decision block 143 in FIG. 13, is to compute the required dwell time. Because RAIN_INT is proportional to human perception of rain intensity, and this is, in turn, proportional to the logarithm of the actual measured flow rate, it is necessary to introduce an exponential characteristic into the computation of dwell times. This is the purpose of the operations reflected at block 145. That is, as RAIN_INT falls further below a threshold (Ref. 217, Table II), the computed DWELL_TIME grows exponentially, as illustrated in the curves of FIG. 7. To further accommodate the system sensitivity preferences of the driver, this dwell time is multiplied by a constant K_DW_MUL block 146 which is changed with sensitivity (SNS_VAL) (Table I, Ref. 206). As illustrated in FIG. 7, at higher sensitivities, a shorter dwell time is computed for a given value of RAIN_INT.

MODE CONTROL

The flow charts of FIGS. 14 and 15 illustrate the background wiper mode control of the wiper system in the automatic mode of operation. These flow charts assume that the previously described rain estimation algorithm (FIGS. 9–13) has established an estimate of rain intensity and an appropriately computed dwell time. Provision for manual operation of the wipers is not illustrated. Such control strategies are well understood and readily implemented by one skilled in the art of designing wiper control systems.

Upon entry into automatic mode (block 148), the microcontroller executes a single actuation of the wipers (block 149), and then turns the wiper motor off (block 150). At this point (block 151), the dwell loop counter, DWELL_COUNT is reset. The microcontroller then proceeds to execute the dwell loop shown enclosed by dashed line box 167. The first step in this loop is to compare the Rain Intensity with a threshold INT_SLW_THR (Table II, Ref 226) at block 152. The threshold, INT_SLW_THR, is set at a level appropriate for a transition from intermittent into steady slow mode of operation. If RAIN_INT, in fact, exceeds this threshold, the wiper motor control is transferred to the steady slow mode (block 160, FIG. 15).

The operation reflected by decision block 153 determines if the RAIN_INT variable is low enough to justify entry into the Automatic-off loop which is shown enclosed by dashed line box 168. The purpose of this loop comprising operation block 157 and decision block 158, is to hold the wiper motor off in the period of a prolonged absence of sensed moisture. Decision block 158 transfers control so as to execute a single wipe upon detection of sufficient rain intensity. It is contemplated that the driver may prefer that the system execute a single wipe every several minutes even in the absence of sensed moisture. (REIN: WHY? ) If the vehicle manufacturer deems this to be the case, blocks 157 and 158 may be modified accordingly.

Continuing with the description of the flow charge of FIG. 14, if the Rain Intensity is still within a range appropriate for operation in an intermittent mode, decision block 154 determines if the computed dwell time (Table I, Ref. 85) has expired. In such a case, the system proceeds to execute another single wipe (block 149). As mentioned earlier, the appropriate DWELL_TIME is frequently being recomputed by the rain estimation algorithm delineated in the flow charts of FIGS. 9–13. Thus, a sudden increase in rain intensity can cut short a dwell interval. Also, a sudden increase in the user-determined sensitivity will have the same effect.

If the dwell interval has not expired, as determined by the test at block 154, the operations depicted at blocks 155 and 156 will delay one-half second and increment the dwell counter variable, DWELL_CNT. Program control is then transferred to the beginning of the dwell loop 167.

Should the aforementioned decision block 152 determine that operation in steady-slow mode is appropriate, program control will proceed, beginning at block 160 of FIG. 15. Upon entry into the steady slow mode, the wipers are made to run at a slow speed (block 161). The operation reflected by block 162 will determine if the RAIN_INT variable has decreased to a point (SLW_INT_THR) where steady slow operation is no longer desirable. If this is the case, control is transferred at block 166 to the Automatic Mode (block 148), whereupon the system will enter the intermittent mode of operation. The thresholds of comparison, SLW_INT_THR and INT_SLW_THR, and indeed all thresholds concerning operational mode of the wipers (Table II, Ref. 225–229), are set in such a way as to allow considerable hysteresis with respect to RAIN_INT, in the example discussed earlier with the aid of FIG. 8D. That is, if the system is operating in a given mode, it will tend to continue to operate in that mode.

With continued reference to FIG. 15, decision block 163 will compare the rain intensity RAIN_INT with a threshold (SLW_FST_THR) to determine if the rain intensity is sufficient to warrant high-speed operation of the wipers. If this is not the case, branch 172 will be followed to continue to keep control of the wipers in a loop at the steady slow speed. Otherwise, the program control will transfer to block 164, which will run the wipers at fast speed. The test at decision block 165 will determine whether to hold control in the steady-fast loop 169 until RAIN_INT has decreased through the threshold FST_SLW_THR and low enough for operation at steady slow speed. In such case, branch 170 will be followed to transfer control to the steady slow loop 171. Thus, the flow charts of FIGS. 14 and 15 fully describe the control of the wipers in the automatic mode of operation.

Peripheral Control

As previously mentioned, control schemes for manual operation are not illustrated here. Other microprocessor based interface functions, such as reading the driver-accessible switch, implementing a wash function, and methods of operating the wiper motor, are also considered to be readily implemented by one skilled in the art of automotive wiper controls.

Figure 16:
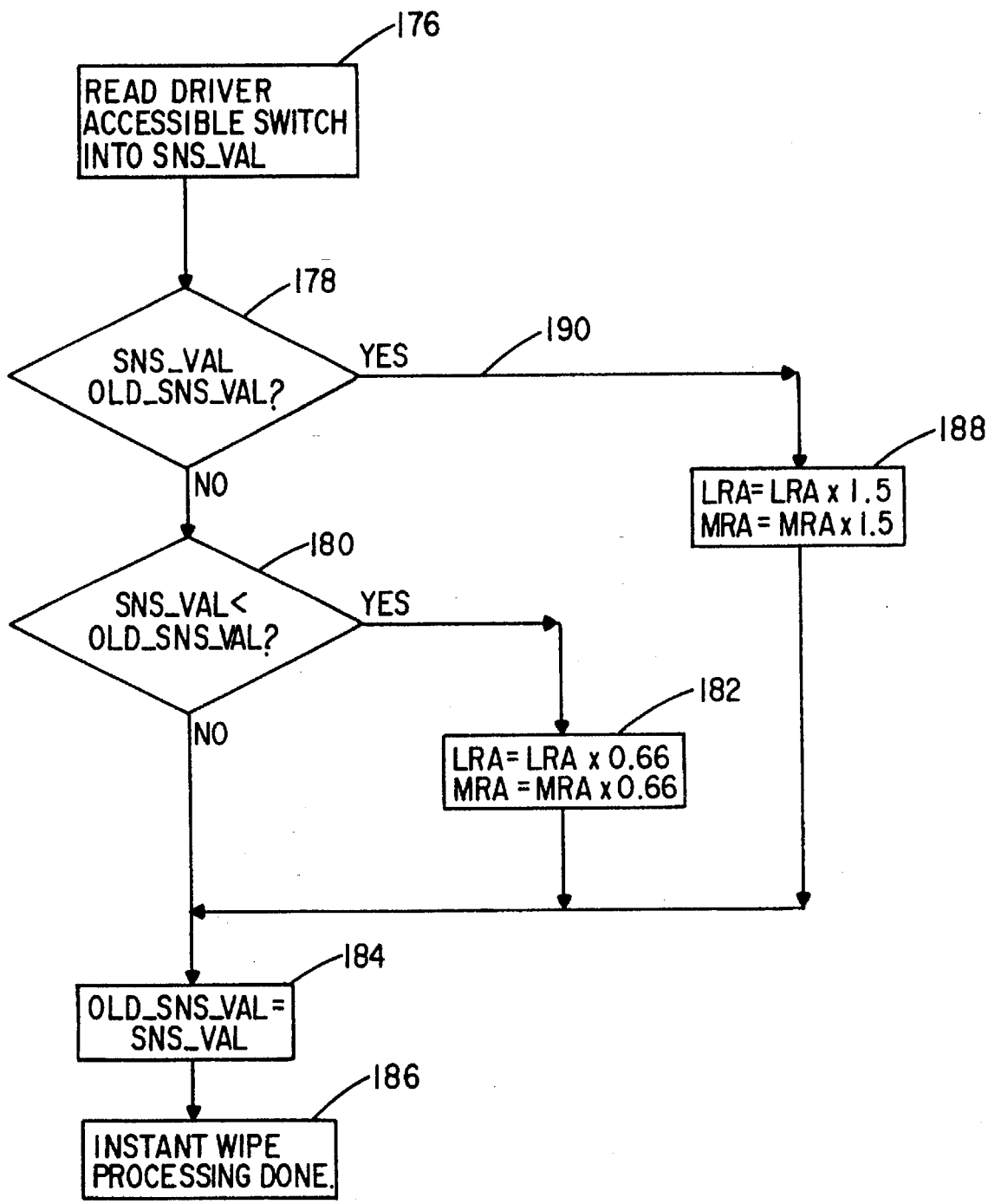
FIG. 16 is a software flow diagram for implementing instant sensitivity response.

The instant sensitivity response, as previously mentioned, is a desirable feature of this invention, and FIG. 16 depicts a flow chart for its implementation. The operation of block 176, which is specific to the vehicle interface, reads the position of the sensitivity control into a register SNS_VAL (Table I, Ref. 206). This occurs in a background control loop, and is executed several times every second. As indicated by decision block 178, a comparison is next made with the previously read value of sensitivity, OLD_SNS_VAL. If the sensitivity has increased, branch 190 executes, and the operation at block 188 increases the medium and long range averages by a factor of 1.5. This has the effect of reinterpreting the history of the stimulus, and the previously described mode control will instantly respond to the change.

Alternatively, if at decision block 180, it determined that the sensitivity value has just decreased, medium and long range averages are both multiplied by a factor of 0.66, at block 182 and mode control will instantly slow down operation of the wipers. In either case, the operation at block 184 will update the value of OLD_SNS_VAL (Table I, Ref. 210), and the processing of the instant sensitivity response subsequently terminates as indicated by block 186.

Conclusion

All of the features described in this invention serve to address an intractable problem, i.e., how to devise a control strategy that functions appropriately with signals from a sampled area which is very small in comparison to the size of the entire windshield. Further, they address the conflicting requirements that the resulting system must be simultaneously smooth and responsive. The solutions employed seek to mimic human perception. The net result of all of these features is a system which in field evaluations has proven to be subjectively very pleasing to the driver. Thus, the driver of the vehicle typically soon learns to forget about the operation of the windshield wipers, which is the ultimate objective of a moisture-sensing wiper control system.

This invention has been described herein in considerable detail in order to comply with the Patent Statutes and to provide those skilled in the art with the information needed to apply the novel principles and to construct and use such specialized components as are required. However, it is to be understood that the invention can be carried out by specifically different equipment and devices, and that various modifications, both as to the equipment details and operating procedures, can be accomplished without departing from the scope of the invention itself.

What is claimed is:

1. A rain responsive windshield wiper control system for a vehicle of the type having a windshield, a windshield wiper adapted to be driven by a windshield wiper motor for sweeping moisture from the windshield, the windshield wiper control system comprising:

(a) a sensor disposed at a predetermined location on a vehicle windshield traversed by the wiper for generating an output indicative of the moisture impinging on the windshield proximate the predetermined location, said sensor means producing a recent rain flux value;

(b) a plurality of averaging means operatively coupled to receive said recent rain flux values and to produce outputs to a combining means for forming a single weighted average value of rain flux;

(c) wiper mode control means operatively coupled to receive said single weighted average value of rain flux for establishing a sweep rate for the windshield wiper; and (d) means for electrically driving the wiper motor at the sweep rate determined by the wiper mode control means.

2. The rain responsive windshield wiper control system as in claim 1 wherein at least one of the plurality of averaging means forms a long range average of recent rain flux, the long range average being indicative of long range conditions prevailing upon the sensor.

3. A rain responsive windshield wiper control system for a vehicle of the type having a windshield, a windshield wiper adapted to be driven by a windshield wiper motor for sweeping moisture from the windshield, the windshield wiper control system comprising:

(a) sensor means disposed at a predetermined location on the vehicle windshield traversed by the wiper for generating rain event signals indicative of moisture impinging on the windshield proximate the predetermined location;

(b) counting means responsive to the rain event signals for repeatedly determining the frequency of occurrence of the rain event signals within a predetermined time interval and to provide an output related thereto;

(c) a first memory means operatively coupled to repeatedly receive the output of said counting means at predetermined time intervals, said memory means storing a value;

(d) a second memory means operatively coupled to subsequently repeatedly and subsequently receive and store the value stored in said first memory means;

(e) a third memory means operative coupled to receive and store the value stored in said second memory means;

(f) totalizing means for summing the values stored in said first, second and third memory means, said totalizing means thereby forming a value corresponding to the frequency of occurrence of said rain event signals within a sliding window comprised of a plurality of predetermined time intervals;

(g) smoothing means coupled to receive said value corresponding to the frequency of occurrence of said rain event signals;

(h) wiper mode control means operatively coupled to the smoothing means for establishing a sweep speed for the windshield wiper; and (i) means for electrically driving the wiper motor at the sweep speed determined by the wiper mode control means.

4. The rain responsive windshield wiper control system as in claim 3 wherein said first, second and third memory means comprise a first-in, first-out shift register.

5. The rain responsive windshield wiper control system as in claim 3 wherein the rain event signals comprise reversals of an output of the sensor means toward a predetermined quiescent level.

6. The rain responsive windshield wiper control system as in claim 3 wherein the smoothing means comprises:

(a) means for forming a weighted average of the recent rain flux values over an extended time period greater than the predetermined time interval.

7. The rain responsive windshield wiper control system as in claim 6 wherein the means for forming a weighted average of the recent rain flux values comprises:

(a) means for deriving a medium range average of the recent rain flux values;

(b) means for deriving a long range average of the recent rain flux values; and (c) means for combining the medium range average and long range average of the recent rain flux values.

8. The rain responsive windshield wiper control system as in claim 3 wherein the wiper mode control means includes means for establishing a first rain intensity threshold at which the mode changes between an intermittent operation and slow continuous wiping speed, a second rain intensity threshold at which the mode changes between fast and slow continuous wiping speed and a third rain intensity threshold at which the mode changes between slow and fast continuous wiping speed, the third threshold being at a rain intensity level greater than that of the second threshold.

9. A rain responsive windshield wiper control system for a vehicle of the type having a windshield, a windshield wiper adapted to be driven by a windshield wiper motor for sweeping moisture from the windshield, the windshield wiper control system comprising:

(a) sensor means disposed at a predetermined location on the vehicle windshield traversed by the wiper for generating rain event signals indicative of moisture impinging on the windshield proximate the predetermined location;

(b) means responsive to the rain event signals for repeatedly determining the number of the rain event signals occurring within a predetermined time interval to provide a recent rain flux value;

(c) logarithmic conversion means for converting the recent rain flux value to a recent rain intensity value whereby said recent rain intensity value mimics human perception of rain intensity;

(d) smoothing means coupled to receive the recent rain intensity value for producing an output signal in which momentary variations in the recent rain intensity value are eliminated;

(e) wiper mode control means operatively coupled to the smoothing means for establishing a sweep rate of the windshield wiper; and (f) means for electrically driving the wiper motor at the sweep rate determined by the wiper mode control means.

10. The rain responsive windshield wiper control system as in claim 9 wherein the rain event signals comprise reversals of an output of the sensor means toward a predetermined quiescent level.

11. The rain responsive windshield wiper control system as in claim 9 wherein the means for determining the number of rain event signals occurring within a predetermined time interval comprises means for repeatedly totalizing a number of rain event signals occurring within discrete, equal time intervals whose sum equals the predetermined time interval.

12. The rain responsive windshield wiper control system as in claim 11 wherein the means for repeatedly totalizing a number of the rain event signals comprises:

(a) an analog-to-digital converter having an input connected to receive the rain event signals from the sensor means and an output;

(b) counting means connected to the output of the analog-to-digital converter for continuously counting the number of the rain event signals occurring within a given time period which is less than the predetermined time interval; and (c) means for summing the number of rain event signals occurring within successive ones of the given time periods over the predetermined time interval.

13. The rain responsive windshield wiper control system as in claim 9 wherein the smoothing means comprises:

(a) means for forming a weighted average of the recent intensity values over an extended time period greater than the predetermined time interval, said weighted average being comprised of a plurality of averages.

14. The rain responsive windshield wiper control system as in claim 13 wherein the means for forming a weighted average of the recent rain intensity value comprises:

(a) means for deriving a medium range average of the recent rain intensity value;

(b) means for deriving a long range average of the recent rain intensity value; and (c) means for combining the medium range average and the long range average.

15. The rain responsive windshield wiper control system as in claim 9 wherein the wiper mode control means includes:

(a) means for establishing a first rain intensity threshold at which the wiping mode changes between an intermittent operation and a slow continuous wiping speed;

(b) a second rain intensity threshold at which the wiping mode changes between fast and slow continuous wiping speed; and (c) a third rain intensity threshold at which the wiping mode changes between a slow and a fast continuous wiping speed, the third threshold being at a rain intensity level greater than that of the second threshold.

16. The rain responsive windshield wiper control system as in claim 9 wherein the wiper mode control means includes:

(a) exponential conversion means for converting the output signal from the smoothing means to a corresponding linear time value.

17. The rain responsive windshield wiper control system as in claim 9 wherein the smoothing means comprises first and second filter means, each exhibiting an asymmetrical attack and decay time for increasing and decreasing recent rain intensity values, respectively.

18. The rain responsive windshield wiper control system as in claim 9 wherein a decay time of the first filter means differs from a decay time of the second filter means.

19. The rain responsive windshield wiper control system as in claim 14 wherein the means for deriving a long range average of the recent rain intensity includes:

(a) means for increasing a current value of the long range average of the recent rain intensity upon detection of an increase in setting of a driver-accessible sensitivity control; and (b) means for decreasing the current value of the long range average of the recent rain intensity upon detection of the decrease in setting of the driver-accessible sensitivity control.

20. A rain responsive windshield wiper control system for a vehicle of the type having a windshield, a windshield wiper adapted to be driven by a windshield wiper motor for sweeping moisture from the windshield, the windshield wiper control system comprising:

(a) sensor means disposed at a predetermined location on a vehicle windshield traversed by the wiper for generating rain event signals indicative of moisture impinging upon the windshield proximate the predetermined location;

(b) means responsive to the rain event signals for repeatedly determining the frequency of occurrence of the rain event signals within a predetermined time interval to provide a recent rain flux value, the frequency determining means comprising (i) an analog-to-digital converter having an input connected to receive the rain event signals from the sensor means and an output, (ii) counting means connected to the output of the analog-to-digital converter for continuously counting the number of the rain event signals occurring within a given time period which is less than the predetermined time interval, (iii) means for summing the number of rain event signals occurring within successive ones of the given time periods over the predetermined time interval, (c) smoothing means coupled to receive the recent rain flux value for eliminating momentary variations in said recent rain flux value;

(d) wiper mode control means operatively coupled to the smoothing means for establishing a sweep speed for the windshield wiper; and (e) means for electrically driving the wiper motor at the sweep speed determined by the wiper mode control means.

* * * * *